United States Patent
Su et al.

(10) Patent No.: US 9,078,600 B2
(45) Date of Patent: Jul. 14, 2015

(54) IMAGE PROCESSING DEVICE, BIOMETRIC AUTHENTICATION DEVICE, IMAGE PROCESSING METHOD, AND RECORDING MEDIUM

(75) Inventors: Leiming Su, Tokyo (JP); Yukio Hoshino, Kanagawa (JP); Yukio Itakura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 642 days.

(21) Appl. No.: 13/143,444

(22) PCT Filed: Jan. 22, 2010

(86) PCT No.: PCT/JP2010/050830
§ 371 (c)(1),
(2), (4) Date: Jul. 6, 2011

(87) PCT Pub. No.: WO2010/084963
PCT Pub. Date: Jul. 29, 2010

(65) Prior Publication Data
US 2011/0267447 A1    Nov. 3, 2011

(30) Foreign Application Priority Data
Jan. 22, 2009    (JP) .................... 2009-012411

(51) Int. Cl.
*G06K 9/00* (2006.01)
*A61B 5/117* (2006.01)

(52) U.S. Cl.
CPC .............. *A61B 5/117* (2013.01); *G06K 9/0061* (2013.01)

(58) Field of Classification Search
CPC ............... B67C 3/007; G01B 11/2433; G01N 21/9036; G06K 9/0061; A61B 5/117
USPC ..................... 382/117; 348/78, 127
See application file for complete search history.

(56) References Cited

U.S. PATENT DOCUMENTS
2005/0105827 A1 * 5/2005 Yonaha et al. ................ 382/291
2007/0160267 A1 * 7/2007 Jones et al. .................... 382/117

FOREIGN PATENT DOCUMENTS
JP           3307936 B     7/2002
JP        2006099718 A     4/2006
JP        2007226424 A     9/2007

OTHER PUBLICATIONS
International Search Report for PCT/JP2010/060830 mailed Apr. 20, 2010.

* cited by examiner

*Primary Examiner* — William C Vaughn, Jr.
*Assistant Examiner* — Naod Belai
(74) *Attorney, Agent, or Firm* — Sughrue Mion, PLLC

(57) ABSTRACT

An image of the iris contained in an image of an eye is accurately specified. An image of the iris contained in a digital image (P) of an eye is accurately specified. In view of low-intensity pixels of the digital image (P) of the eye, and high-intensity pixels having a predetermined relationship with the low-intensity pixels, a reference pixel ($PX_0$) that defines the center of the pupil is determined. Thereby, the center of the pupil can be specified more accurately when compared to the case where, for example, it is determined only from the low-intensity pixels. Therefore, the accuracy of the process to specify the iris image on the basis of the reference pixel is improved, and as a result, the iris image can be accurately specified.

14 Claims, 23 Drawing Sheets

IMAGE PROCESSING DEVICE, BIOMETRIC AUTHENTICATION DEVICE, IMAGE PROCESSING METHOD, AND RECORDING MEDIUM

This application is the National Phase of PCT/JP2010/050830, filed Jan. 22, 2010, which is based on Japanese Patent Application No. 2009-012411, filed on Jan. 22, 2009. The entire specification, claims and drawings of Japanese Patent Application No. 2009-012411 are incorporated in this specification by reference.

TECHNICAL FIELD

The present invention relates to an image processing device, biometric authentication device, image processing method and recording medium, and more particularly to an image processing device that performs image processing on a digital image of an eye, a biometric authentication device that performs authentication using a pattern of an iris, an image processing method for performing image processing on a digital image of an eye, and a computer readable recording medium on which a program is recorded for causing a computer to perform image processing on a digital image of an eye.

BACKGROUND ART

In recent years, in addition to codes and passwords that are combinations of letters and symbols, research and development in the biometric authentication technology of performing authentication by using physical features of a target person is being performed. In performing biometric authentication, physical features such as fingerprints, dorsal hand vein patterns, the iris patterns of eyes, voice prints, and the like that are not uniform among individuals are typically used. Particularly, as authentication accuracy improves, and the cost of devices comes down, authentication devices that use fingerprints or dorsal hand vein patterns are starting to be used in various kinds of devices such as an ATM (Automatic Teller Machine) or a personal computer (PC).

However, in authentication using fingerprints or dorsal hand vein patterns, the target person must bring part of the body such a finger or hand in contact with or close to the device. Therefore, recently biometric authentication technology that uses the iris pattern of an eye is gaining much attention (for example, refer to Patent Literature 1).

RELATED LITERATURE

Patent Literature

Patent Literature 1: Japanese Patent Number 3,307,936

DISCLOSURE OF INVENTION

Problem to be Solved by the Invention

The iris of an eye has characteristic properties such as expanding or contracting as it reacts to light, and changing shape according to the direction of the eye. Therefore, in order to perform accurate authentication using an iris pattern, the image of the iris that is included in an image of an eye must be identified accurately.

Taking into consideration the conditions above, the object of the present invention is to provide an image processing device that is capable of accurately identifying an image of an iris that is included in the image of an eye.

Means for Solving the Problem

In order to accomplish the object of the invention, an image processing device of a first aspect of the present invention comprises: an extraction unit that extracts low-intensity pixels, which have an intensity equal to or less than a specified intensity, from a digital image of an eye; an assignment unit that sequentially selects the low-intensity pixels that were extracted by the extraction unit, and sequentially assigns specified values to each pixel that is within a specified distance from the selected low-intensity pixels; and a setting unit that, based on a value that is totaled for each pixel of values that are assigned to the pixels, sets a reference pixel that corresponds to the center of the pupil of the eye.

A biometric authentication device of a second aspect of the present invention comprises an imaging device that takes a digital image of an eye, and the image processing device of the present invention.

An image processing method of a third aspect of the present invention comprises steps of: extracting low-intensity pixels, which have an intensity equal to or less than a specified intensity, from a digital image of an eye; sequentially selecting the low-intensity pixels that were extracted by the extraction unit, and sequentially assigning specified values to each pixel that is within a specified distance from the selected low-intensity pixels; setting, based on a value that is totaled for each pixel of values that are assigned to the pixels, a reference pixel that corresponds to the center of the pupil of the eye; specifying, in the digital image, a first circle, the center thereof being the reference pixel, and a second circle having a radius greater than that of the first circle; calculating the ratio of the amount of increase in the number of low-intensity pixels inside the second circle from the number of low-intensity pixels inside the first circle with respect to the amount of increase in the surface area of the second circle from the surface area of the first circle; and when the ratio calculated is equal to or less than a specified value, moving the second circle and detecting the position of the center of the second circle where the number of low-intensity pixels inside the second circle becomes a maximum.

A recording medium of a fourth aspect of the present invention records a program that causes a computer to function as: an extraction unit that extracts low-intensity pixels, which have an intensity equal to or less than a specified intensity, from a digital image of an eye; an assignment unit that sequentially selects the low-intensity pixels that were extracted by the extraction unit, and sequentially assigns specified values to each pixel that is within a specified distance from the selected low-intensity pixels; a setting unit that, based on a value that is totaled for each pixel of values that are assigned to the pixels, sets a reference pixel that corresponds to the center of the pupil of the eye; a specification unit that, in the digital image, specifies a first circle, the center thereof being the reference pixel, and a second circle having a radius greater than that of the first circle; an operation unit that calculates the ratio of the amount of increase in the number of low-intensity pixels inside the second circle from the number of low-intensity pixels inside the first circle with respect to the amount of increase in the surface area of the second circle from the surface area of the first circle; and a position detection unit that, when the ratio calculated by the operation unit is equal to or less than a specified value, moves the second circle and detects the position of the center of the second circle where the number of low-intensity pixels inside the second circle becomes a maximum.

Effect of the Invention

With the present invention, it is possible to accurately identify an image of an iris that is included in an image of an eye.

BEST MODE FOR CARRYING OUT THE INVENTION (Embodiment 1)

Figure 1:
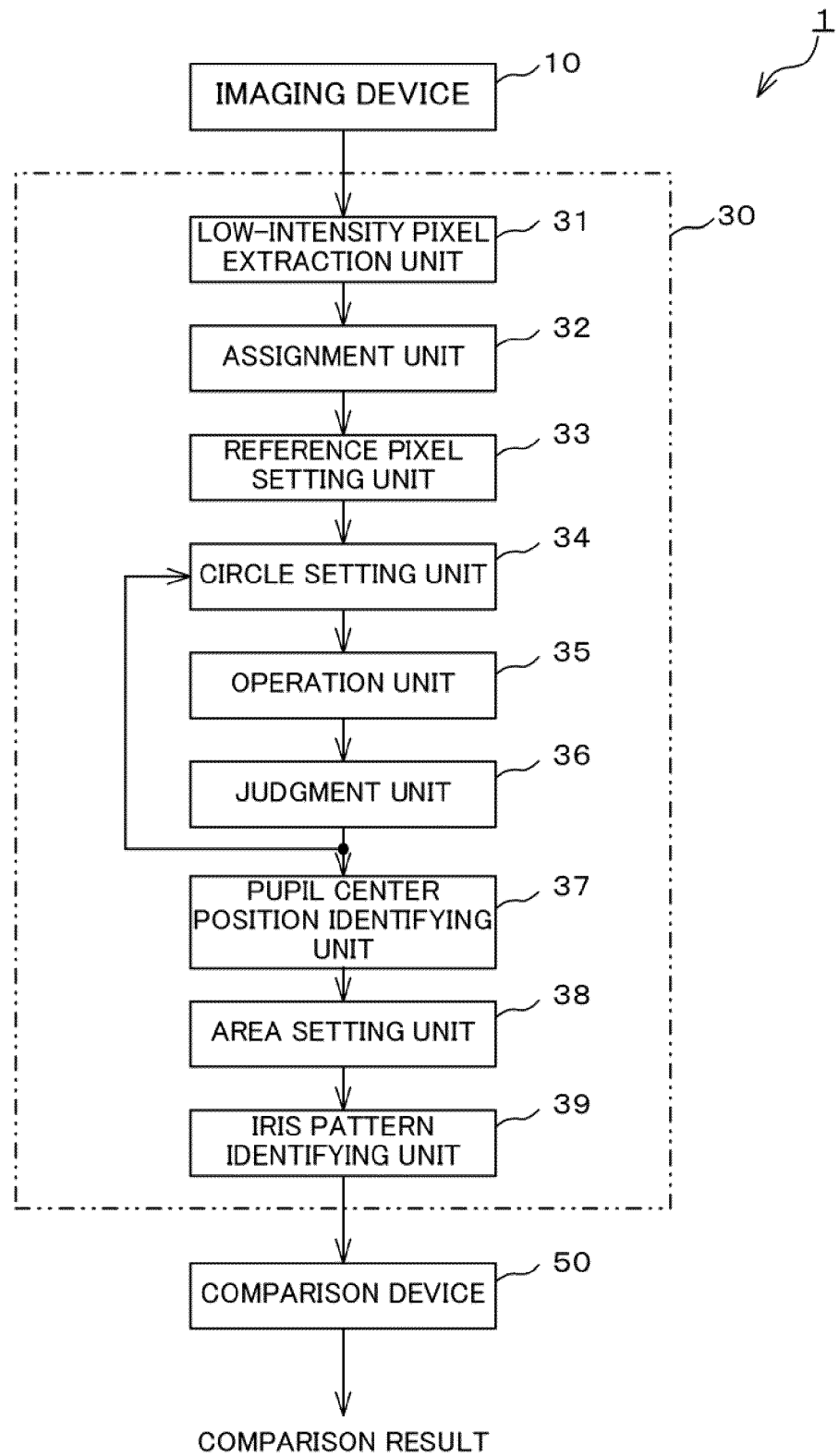
FIG. 1 is a block diagram that schematically illustrates the construction of a biometric authentication device of a first embodiment of the present invention.

In the following, a first embodiment of the present invention will be explained with reference to FIG. 1 to FIG. 19. FIG. 1 is a block diagram that schematically illustrates a biometric authentication device 1 of a first embodiment. The biometric authentication device 1 is a device that performs authentication using an iris pattern of the target person. The biometric authentication device 1 comprises an imaging device 10, an image processing device 30 and a comparison device 50.

Figure 2:
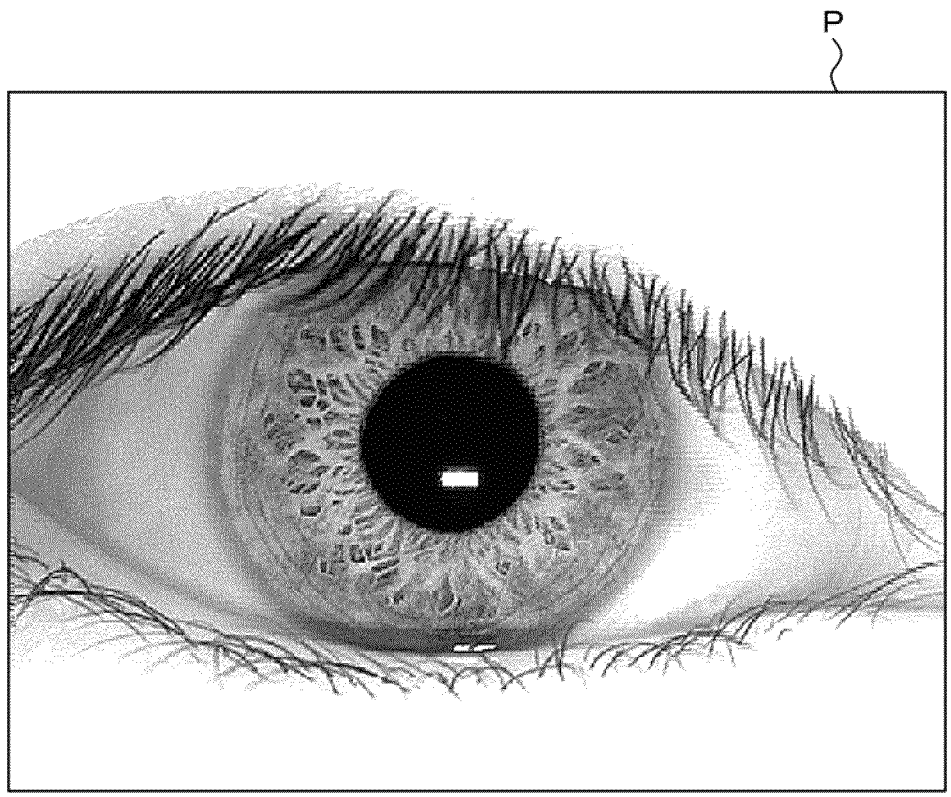
FIG. 2 is a diagram illustrating a digital image.

The imaging device 10 comprises a lighting device that shines light that includes infrared rays, for example, and an infrared camera having an infrared filter that cuts out all visible light except infrared rays. The imaging device 10 outputs a digital image, which was obtained by taking an image of the eye of a target person, to the image processing device 30. FIG. 2 illustrates a digital image P, which is an example of a digital image that was taken by the imaging device 10. As can be seen from FIG. 2, the imaging device 10 takes an image of at least the iris of the target person and part of the surrounding eyelid and eyelashes. The imaging device 10 takes an image using infrared light, so the digital image P is a grayscale image.

Figure 3:
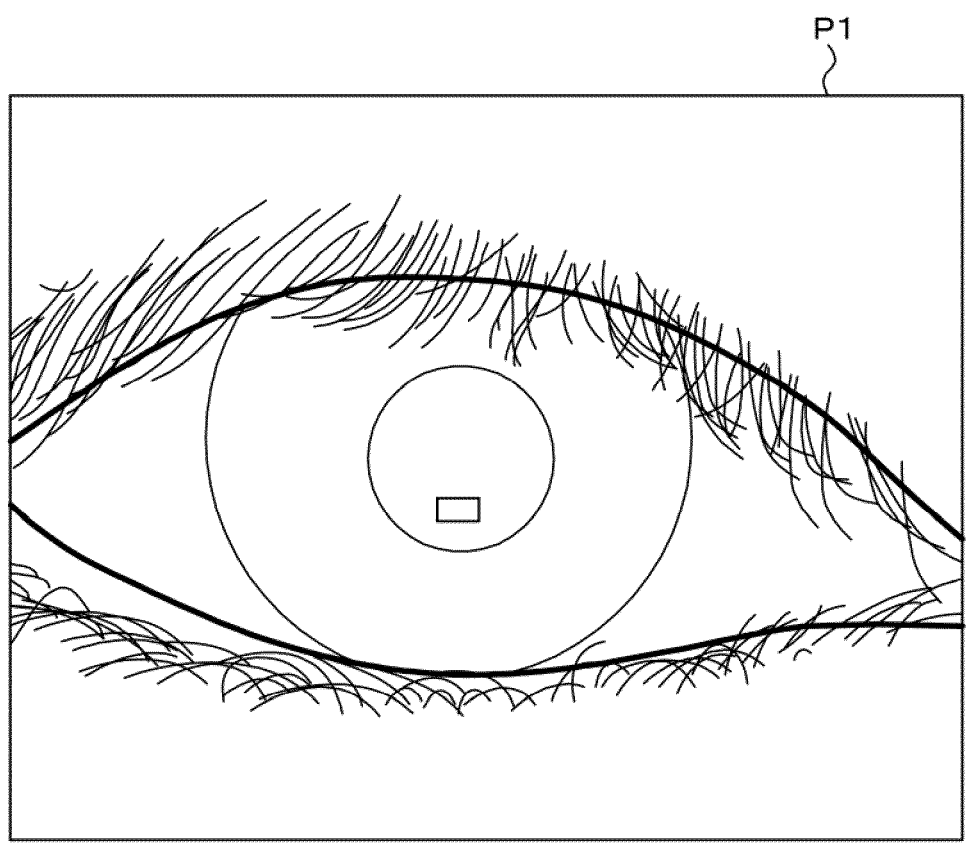
FIG. 3 is a diagram illustrating an image that simplifies the digital image.

The image P1 that is illustrated in FIG. 3 is an image that simplifies the digital image P by using only lines for the contour of the iris and surrounding portions. In the following, for convenience, the explanation will use digital image P, and as necessary, the explanation will use the image P1 that corresponds to the digital image P.

Returning to FIG. 1, the image processing device 30 has a low-intensity pixel extraction unit 31, an assignment unit 32, a reference pixel setting unit 33, a circle setting unit 34, an operation unit 35, a judgment unit 36, a pupil center position identifying unit 37, an area setting unit 38, and an iris pattern identifying unit 39.

Figure 4:
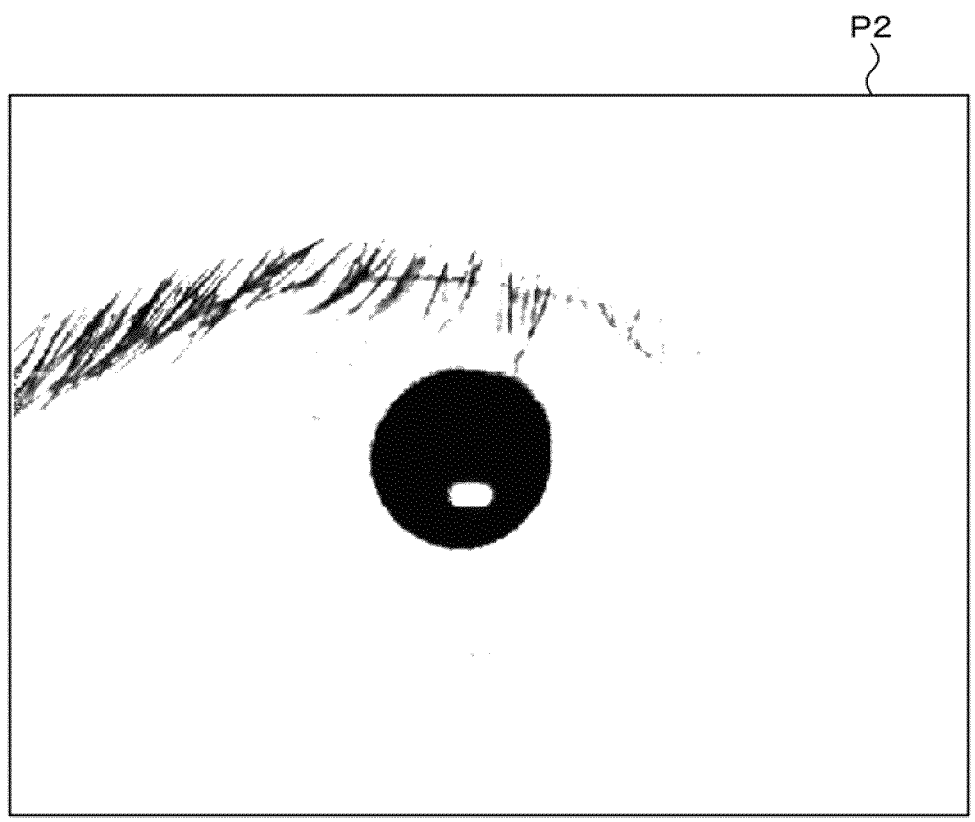
FIG. 4 is a diagram illustrating a binary image.

The low-intensity pixel extraction unit 31 extracts low-intensity pixels having an intensity that is equal to or less than a specified value from the plurality of pixels of the digital image P that is outputted from the imaging device 10. Extraction of the low-intensity pixels is performed, for example, by converting the digital image P to a binary image, and extracting pixels having intensity at that time of 0. As an example, FIG. 4 illustrates a binary image P2 that is obtained by performing image conversion using a specified threshold value. The low-intensity pixel extraction unit 31 extracts low-intensity pixels of the black portions of the binary image P2 illustrated in FIG. 4, and outputs information that includes the extraction results to the assignment unit 32. The threshold value used by the low-intensity pixel extraction unit 31 can be set according to the imaging conditions of the digital image P. In this embodiment, this threshold values is set so that in the binary image P2, pixels of the iris image appear as high-intensity pixels, and pixels of the pupil image appear as low-intensity pixels. By setting the threshold value in this way, in the binary image P2, the pixels of the image of the pupil and eyelashes mainly appear as low-intensity pixels.

The assignment unit 32 sequentially selects low-intensity pixels that were extracted by the low-intensity pixel extraction unit 31, and assigns a value of 1, for example, to each of the plurality of pixels that are within a specified distance from the selected low-intensity pixels. In the following, the operation of the assignment unit 32 will be explained with reference to FIG. 5, which illustrates a sample image SAMP1.

Figure 5:
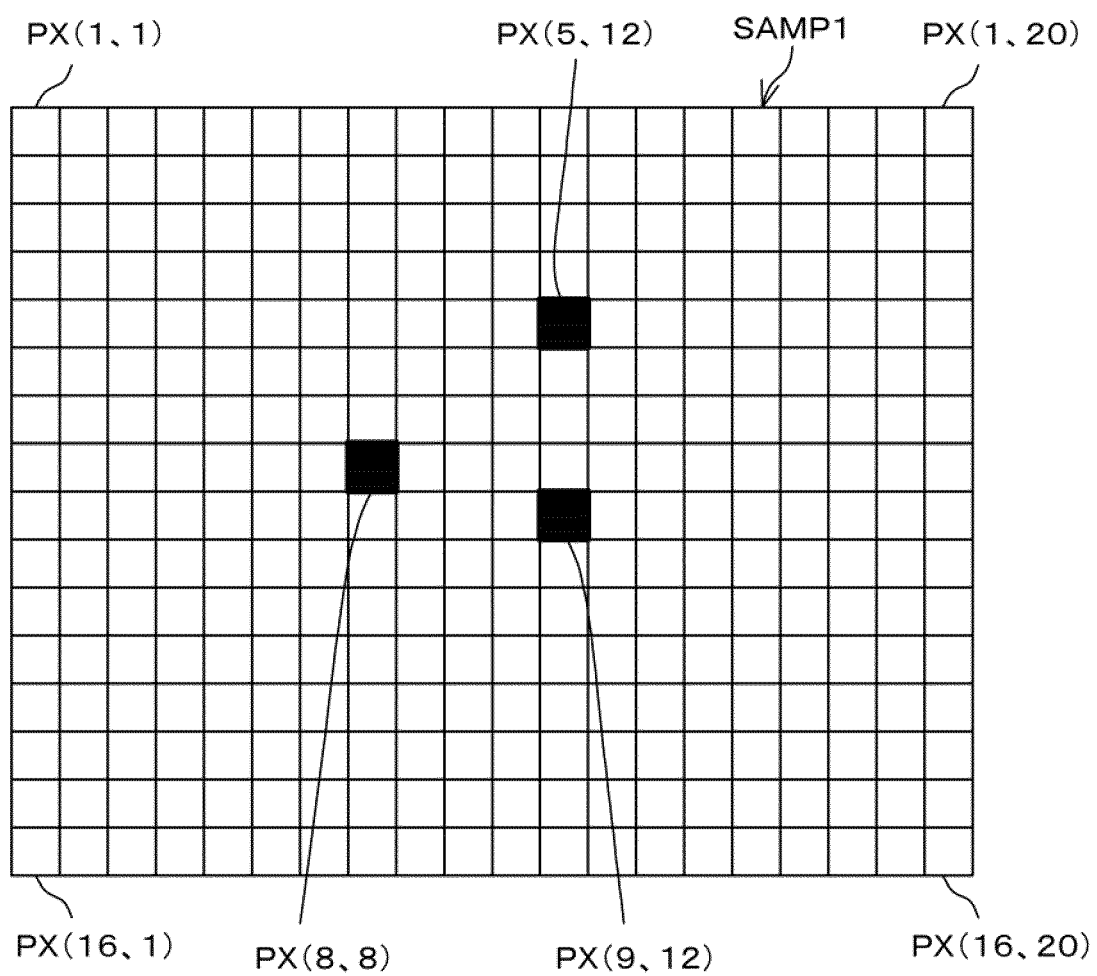
FIG. 5 is a diagram illustrating a sample image.

In the example illustrated in FIG. 5, the sample image SAMP1 is an image having pixels PX(m,n) that are arranged in a 16 row×20 column matrix. Here, m is an integer that expresses the row number 1 to 16, and n is an integer that expresses the column number 1 to 20. This image SAMP1 is a binary image having three low-intensity pixels PX(5,12), PX(8,8) and PX(9,12), and the remaining pixels PX being high-intensity pixels, so the low-intensity pixel extraction unit 31 extracts the three low-intensity pixels PX(5,12), PX(8,8) and PX(9,12). The assignment unit 32 selects the low-intensity pixel PX(5,12) that is on the row 5. Moreover, as can be seen by referencing FIG. 6A, the assignment unit 32 assigns 1 to the low-intensity pixel PX(5,12) and to each of pixels PX(m,n) that are within a specified distance from this low-intensity pixel PX(5,12).

Figure 6A:
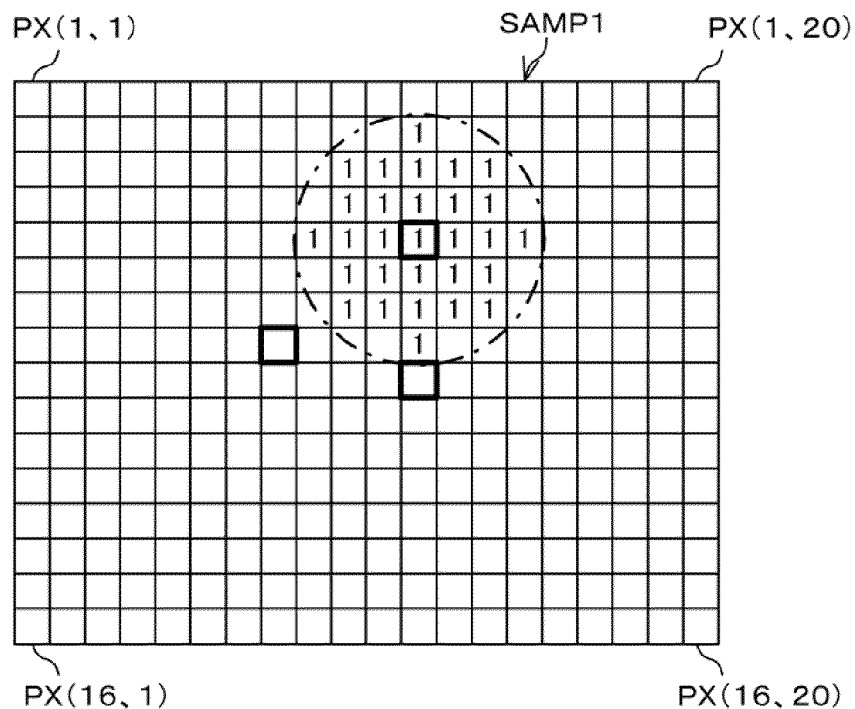
FIG. 6A is a diagram for explaining the operation of an assignment unit (1/3).
Figure 6B:
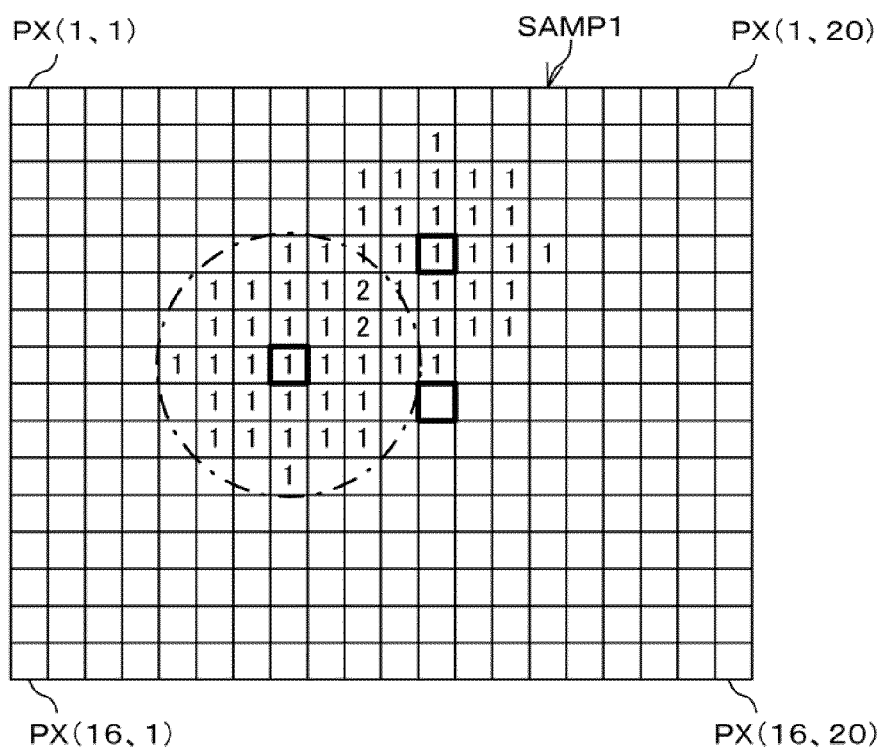
FIG. 6B is a diagram for explaining the operation of an assignment unit (2/3).
Figure 7:
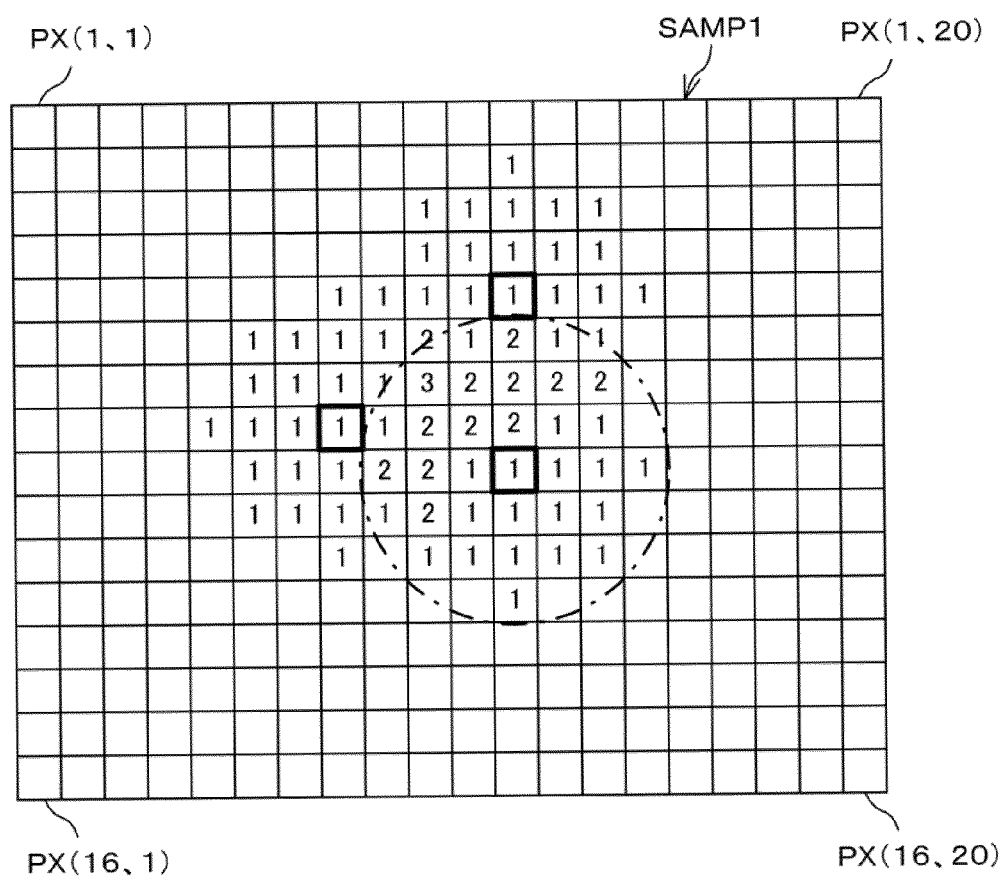
FIG. 7 is a diagram for explaining the operation of an assignment unit (3/3).

Next, the assignment unit 32 selects the low-intensity pixel PX(8,8) on row eight, and as can be seen by referencing FIG. 6B, the assignment unit 32 assigns 1 to the low-intensity pixel PX(8,8) and the each of the pixels PX(m,n) that are within a specified distance from this low-intensity pixel PX(8,8). Here, the pixel PX(6,10) on the sixth row and the pixel PX(7,10) on the seventh row are within the specified distance from both of the low-intensity pixels PX(5,12) and PX(8,8). Therefore, for these pixels PX(6,10) and PX(7,10), the assignment unit 32 totals the values that have been assigned up to this point. As soon as processing is complete, for pixels PX(6,10) and PX(7,10), the totaled value of the assigned values is 2.

Next, the assignment unit 32 selects the low-intensity pixel PX(9,12). As can be seen by referencing FIG. 7, the assignment unit 32 assigns 1 to the low-intensity pixel PX(9,12) and the pixels PX(m,n) that are within a specified distance from this low-intensity pixel PX(9,12). Here, the pixel PX(7,10) on row seven is within a specified distance from both of the low-intensity pixels PX(5,12), PX(8,8) and PX(9,12). Therefore, for pixel PX(7,10), the assignment unit 32 totals the values that have been assigned up until then. After processing is complete, for pixel PX(7,10), the total value of the assigned values becomes 3. The assignment unit 32, executes the processing above for all of the low-intensity pixels that are included in the image. As a result, total values of the assigned values are calculated for each pixel PX(m,n).

Figure 8:
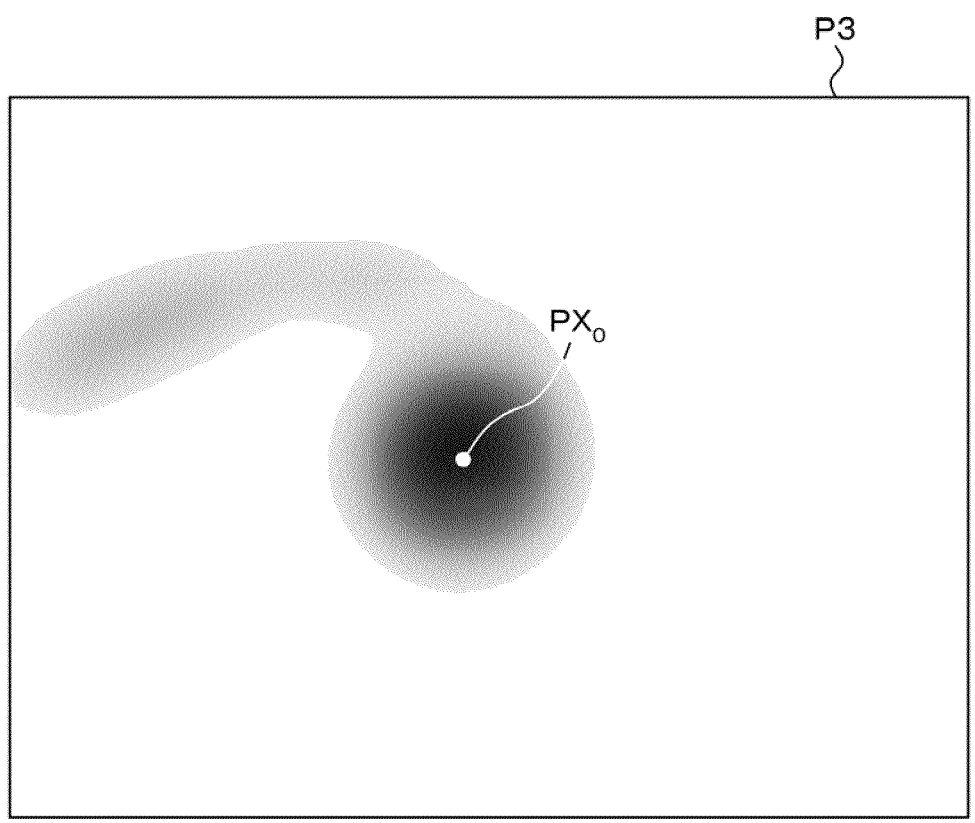
FIG. 8 is a diagram illustrating an image that is obtained from the processing of the assignment unit.

In the image processing device 30, the assignment unit 32 executes the processing described above for all of the low-intensity pixels of the binary image P2. FIG. 8 illustrates an image P3, which is an image that schematically illustrates the result after the assignment unit 32 has performed the processing above on the low-intensity pixels that form the black portions of the binary image P2. In image P3, the state is illustrated in which pixels are colored with a higher density the larger the total value of the values assigned by the assignment unit 32 is. The assignment unit 32 outputs the results of the processing above to the reference pixel setting unit 33.

Figure 9:
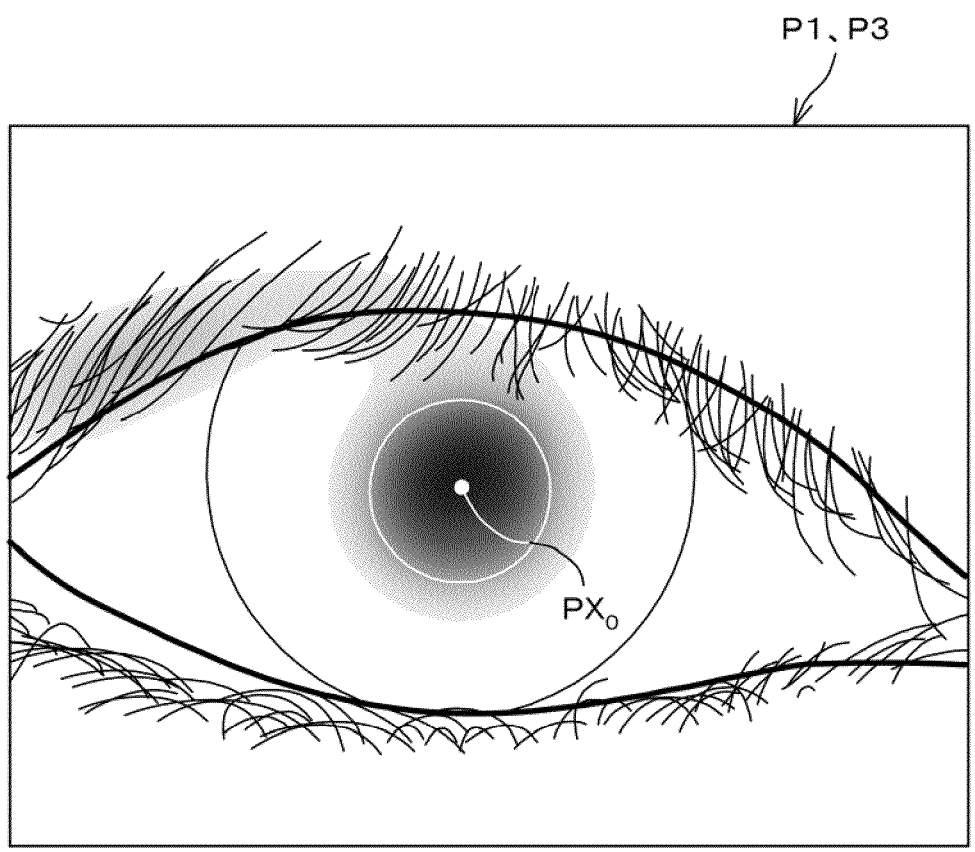
FIG. 9 is a diagram illustrating an image for explaining the processing results of the assignment unit.

The reference pixel setting unit 33 sets the pixel having the largest total value of the assigned values as the reference pixel $PX_0$, and outputs the position of this reference pixel $PX_0$ to the circle setting unit 34. As illustrated in FIG. 8, this reference pixel $PX_0$ coincides with the position of the pixel in image P3 that is displayed with the highest density. Moreover, FIG. 9 illustrates an image that is the result of overlapping image P1 (see FIG. 3) and image P3 (see FIG. 8) (in other words, is an image for explaining the processing result of the assignment unit 32). As illustrated in FIG. 9, the position of the reference pixel $PX_0$ coincides with nearly the center of the pupil of the eye in image P1.

Figure 10:
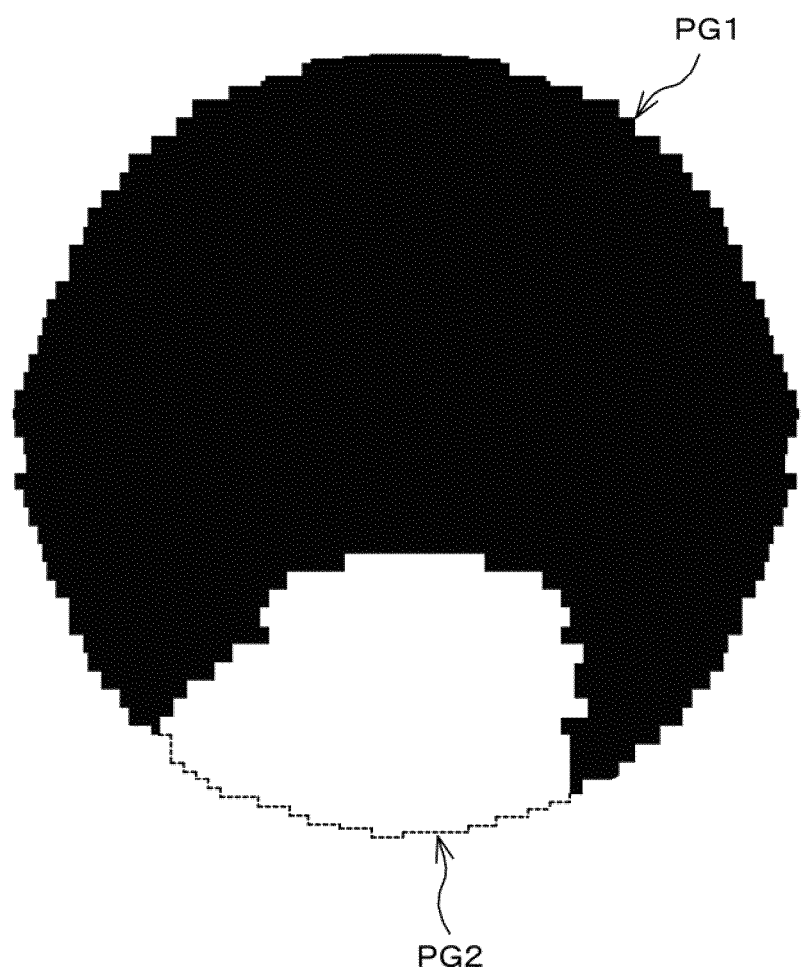
FIG. 10 is a diagram illustrating a low-intensity pixel group and high-intensity pixel group of a pupil.

Incidentally, normally, when taking an image of an eye that includes the pupil, due to the effect of the reflected light that is reflected by the surface of the cornea, the intensity of part of the pixels from among the pixels that form the pupil becomes high. As a result, the pixel group that forms the pupil that appears in the binary image P2 is divided into a low-intensity pixel group PG1 and high-intensity pixel group PG2. FIG. 10 illustrates an example of a low-intensity pixel group PG1 and high-intensity pixel group PG2 of the pupil that is included in the binary image P2. As can be clearly seen from FIG. 10, in this embodiment, the high-intensity pixel group PG2 is eccentrically located within the pixels of the image of the pupil, so it is thought that as the number of pixels of the high-intensity pixel group PG2 increases, the position of the reference pixel $PX_0$ gradually shifts from the center of the pupil. Therefore, the image processing device 30 detects the center position of the pupil based on the distribution of the low-intensity pixel group PG1 of the pupil in the binary image P2, and position information about the reference pixel $PX_0$. Detection of the center position of the pupil is performed by the circle setting unit 34, operation unit 35, judgment unit 36 and pupil center position identifying unit 37 working together.

Figure 11:
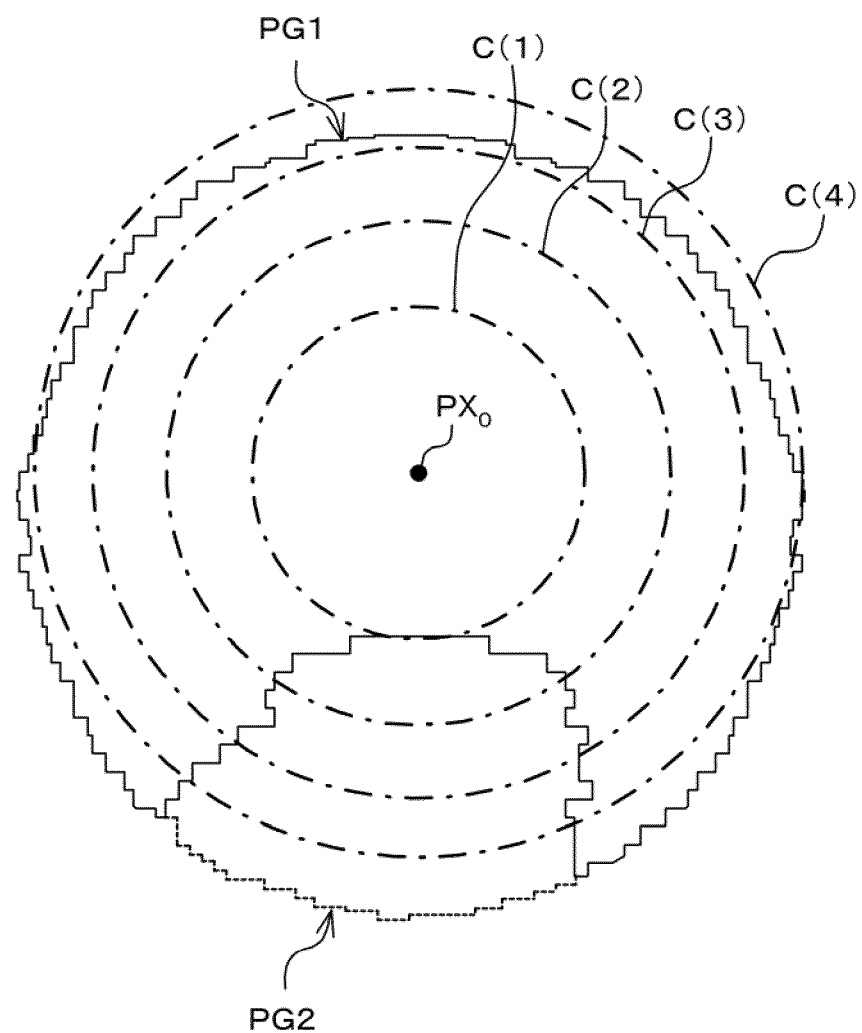
FIG. 11 is a diagram for explaining the operation of a circle setting unit (1/2).

As illustrated in FIG. 11, first, the circle setting unit 34 sets a circle C(1) having the reference pixel $PX_0$ as the center. The radius r(1) of this circle C(1) is set so that it is sufficiently smaller than the radius of the pupil. Next, the circle setting unit 34 sets a circle C(2) having the reference pixel $PX_0$ as the center, and having a radius that is larger than the radius r(1) of the circle C(1).

For example, preferably the radius r(1) of the circle C(1) is set with the distribution range in the X-axis direction or Y-axis direction of the low-intensity pixel group PG1 taken into consideration. More specifically, when the size of the digital image P is 640×480, the radius r(1) of the circle C(1) can be set using Equation (1) below. The summation $\Sigma V$ is the total value at the reference pixel $PX_0$.

$$r(1)=\sqrt{(\Sigma V/\pi)} \quad \text{Equation (1)}$$

Moreover, the radius r(k) of the circle that surrounds the low-intensity pixel group PG1, is expressed, for example, by Equation (2) below.

$$r(k)=r(1)/k \quad \text{Equation (2)}$$

Here, k is a coefficient that is 1 or less. Therefore, it is possible to set the radius of circles other than the circle C(1) (for example, the radius of the circle C(2)) such that it is greater than r(1) but no greater than r(k).

The operation unit 35 calculates the surface area $S_1$ and $S_2$ of the circles C(1) and C(2), and calculates the number of low-intensity pixels $N_1$, $N_2$ inside each circle. The operation unit 35 then calculates the ratio $R_1$ of the number of low-intensity pixels ($N_2-N_1$) inside each circle C(1) and C(2) with respect to the difference in surface area ($S_2-S_1$) of circle C(1) and circle C(2). In other words, $R_1=(N_2-N_1)/(S_2-S_1)$.

The judgment unit 36 determines whether or not the ratio $R_1$ that was calculated by the operation unit 35 is equal to or greater than a specified value. When it is determined that the judgment by the judgment unit 36 is YES, the judgment unit 36 instructs the circle setting unit 4 to once again set a circle.

The circle setting unit 34 receives the instruction from the judgment unit 36 to set a circle, and then sets a circle C(3) that has a radius that is greater than the radius of the circle C(2). The operation unit 35 calculates the surface areas $S_1$, $S_3$ of the circles C(2) and C(3), and calculates the number of low-intensity pixels $N_2$, $N_3$ that are inside each respective circle C(2) and C(3). The operation unit 35 then calculates the ratio $R_2$ of the number of low-intensity pixels ($N_3-N_2$) in each circle with respect to the difference in surface area ($S_3-S_2$) of the circles C(2) and C(3). In other words, $R_2=(N_3-N_2)/(S_3-$ $S_2$). The judgment unit 36 then determines whether or not the ratio $R_2$ that was calculated by the operation unit 35 is equal to or greater than a specified value.

The processing by the circle setting unit 34, the operation unit 35 and the judgment unit 36 is repeatedly executed until the judgment result by the judgment unit 36 is NO. While repeating this processing, the sizes of the two circles that are specified on the image of the pupil of the binary image P2 are gradually increased. Here, the ratios above $R_1$, $R_2$, . . . can collectively be taken to be $R_N$ (N=1, 2, . . . ).

When it is determined while repeating this process that the judgment result by the judgment unit is NO, the judgment unit 36 outputs information such as the radius of the most recently set circle to the pupil center position identifying unit 37. When the judgment result by the judgment unit 36 is NO, the values of the ratios $R_N$ of the two circles calculated by the operation unit 35 (for example, C(1) and C(2), C(2) and C(3), . . . ) are less than the specified value. For example, a case as illustrated in FIG. 11 is considered in which the circles C(1), C(2) and C(3) that are set by the circle setting unit 34 are within the areas specified by the low-intensity pixel group PG1 and high-intensity pixel group PG2, however, the circle C(4) protrudes outside the area. In this case, an image of the pupil is formed inside the circles C(1), C(2) and C(3), and includes only pixels that belong to either the low-intensity pixel group PG1 or high-intensity pixel group PG2, so the ratios $R_1$ and $R_2$ that are calculated by the operation unit 35 are nearly constant.

On the other hand, pixels other than the pixels that belong to the low-intensity pixel group PG1 and high-intensity pixel group PG2 that form the image of the pupil are included in the circle C(4). These pixels are high-intensity pixels that form the image of the iris. Therefore, the number of low-intensity pixels $N_4$ that are included inside the circle C(4) is reduced, and as a result, the ratio $R_3$ $(=(N_4-N_3)/(S_4-S_3))$ that is calculated by the operation unit 35 becomes less than the specified value. In this case, the judgment result by the judgment unit 36 is NO. The judgment unit 36 outputs this judgment result to the pupil center position identifying unit 37.

Figure 12:
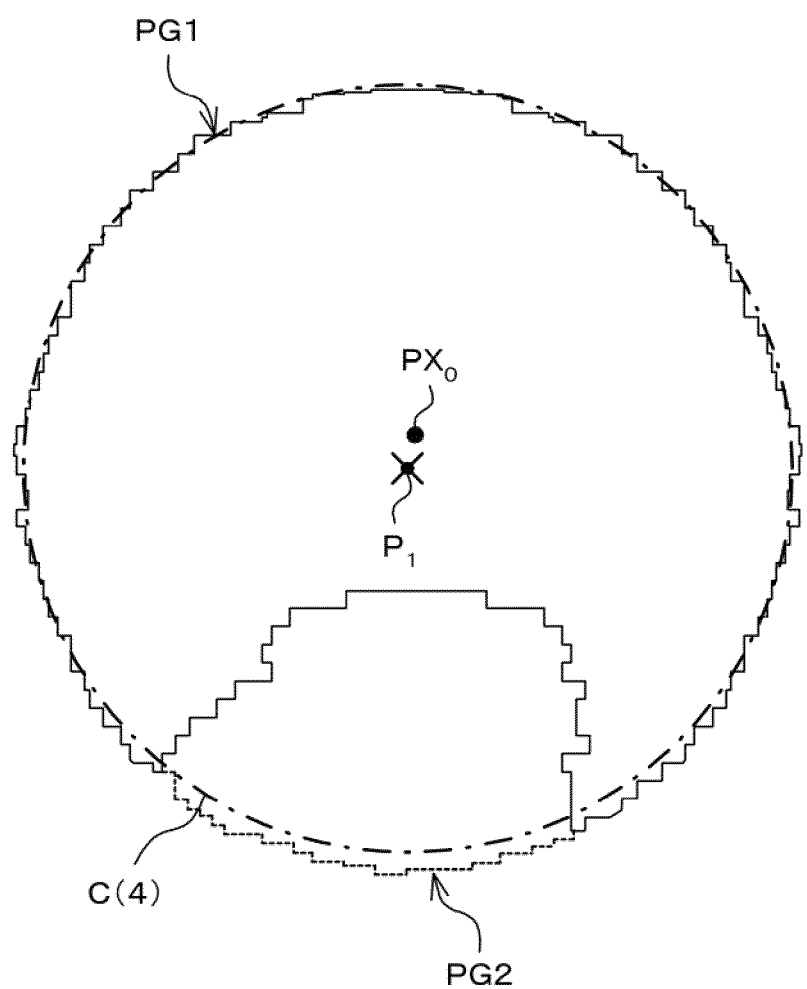
FIG. 12 is a diagram for explaining the operation of a circle setting unit (2/2).

As can be seen by referencing FIG. 12, the pupil center position identifying unit 37, by moving the circle C(4) having reference pixel $PX_0$ as a reference position, searches for the center position $P_1$ of the circle C(4) where the number of low-intensity pixels included in the circle C(4) becomes the maximum. The pupil center position identifying unit 37 then indentifies the found position $P_1$ as the position of the center of the pupil.

Preferably, the radii of the circles C(1) to C(N) are set, so that they differ based on the size of the pixels by an amount of one pixel to several pixels. The smaller the difference between radius of the circle C(N-1) and the radius of the circle C(N) is, the better the accuracy is for detecting the center of the pupil.

Figure 13:
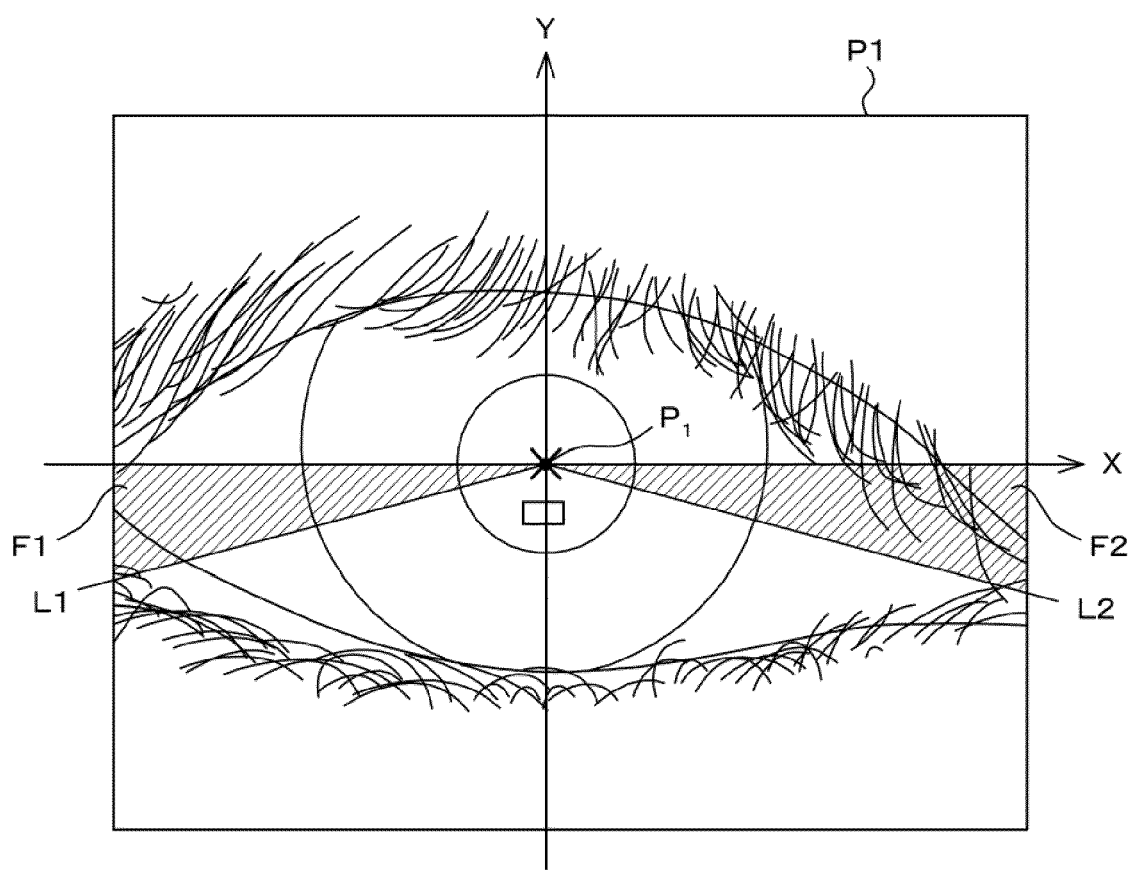
FIG. 13 is a diagram for explaining the operation of an area setting unit (1/2).
Figure 14A:
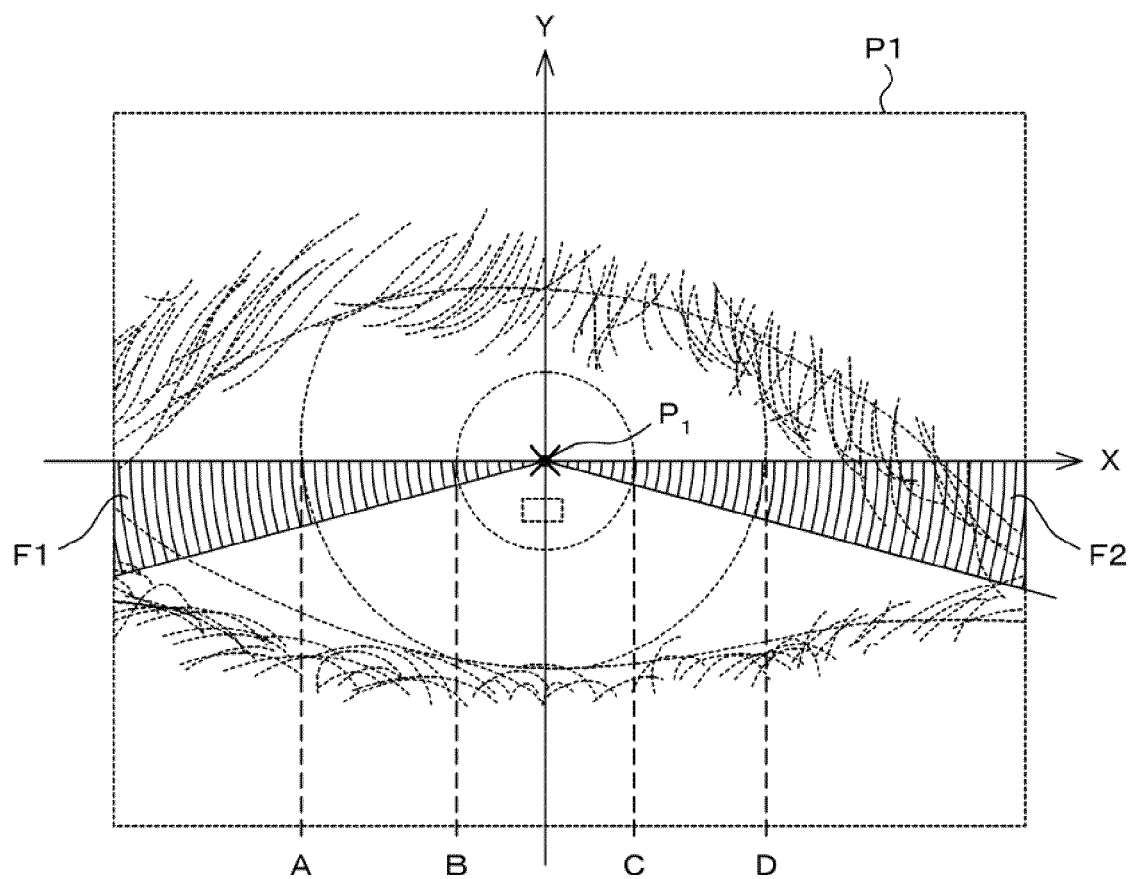
FIG. 14A is a diagram for explaining the operation of an area setting unit (2/2).

As illustrated in FIG. 13, the area setting unit 38 defines an X-Y coordinate system of which the position $P_1$ in the image P1 is the origin. In this coordinate system, the X-axis extends in the horizontal direction. With the position $P_1$ in the image P1 as a starting point, the area setting unit 38 specifies triangular areas F1 and F2 that are specified by straight lines L1, L2 that form a 15-degree angle with the X-axis. Next, as illustrated in FIG. 14A, the area setting unit 38 sets a plurality of small arc-shaped areas by dividing the area F1 with a plurality of arcs having the angle specified by the X-axis and straight line L1 as the central angle. Moreover, the area setting unit 38 sets a plurality of small arc-shaped areas by dividing the area F2 with a plurality of arcs having the angle specified by the X-axis and straight line L2 as the central angle.

Figure 14B:
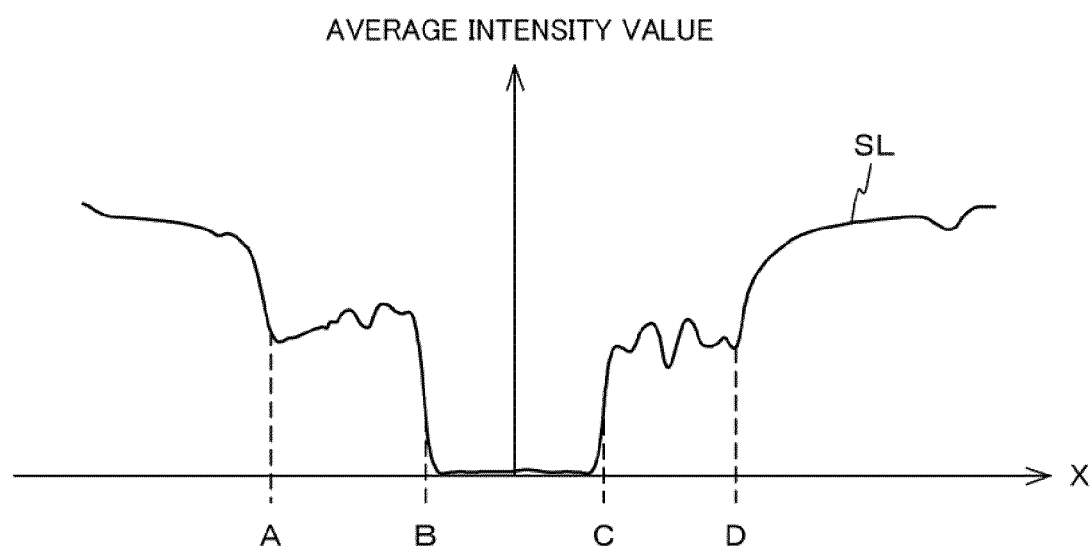
FIG. 14B is a diagram illustrating a characteristic curve.

FIG. 14B illustrates a characteristic curve SL that indicates the relationship between the position x and the average value of the intensity of the pixels that are included in the small arc-shaped areas. The iris pattern identifying unit 39 calculates the average values of the intensity of pixels that are included in each of the small areas that belong to area F1 or area F2. The iris pattern identifying unit 39 then calculates a characteristic curve SL that indicates the relationship between the position on the X-axis of the small areas and the corresponding average intensity values. Next, the iris pattern identifying unit 39, based on the amount of change in this characteristic curve SL, finds the X coordinates A and D of the intersection points where the outer edge of the iris crosses the X-axis.

The X-coordinates A and D of the intersection points can be identified, for example, by comparing derivative values, which are obtained by differentiating the characteristic curve SL at positions x on the X-axis, with specified threshold values. As can be seen by referencing the characteristic curve SL of FIG. 14B, there is typically continuity in the amount of change in the average intensity value on the borders between the iris area and the white of the eye. Also, in the area of change from the iris area to the area of the white of the eye, the amount of change in the average intensity value is greater than in other areas. By using this characteristic, and using the derivative values of the characteristic curve SL, it is possible to accurately find the X coordinates A and D of the intersection points between the X-axis and the outer edge of the iris. Also, the X coordinates B and C are the intersection points between the X-axis and the outer edge of the pupil.

Figure 15:
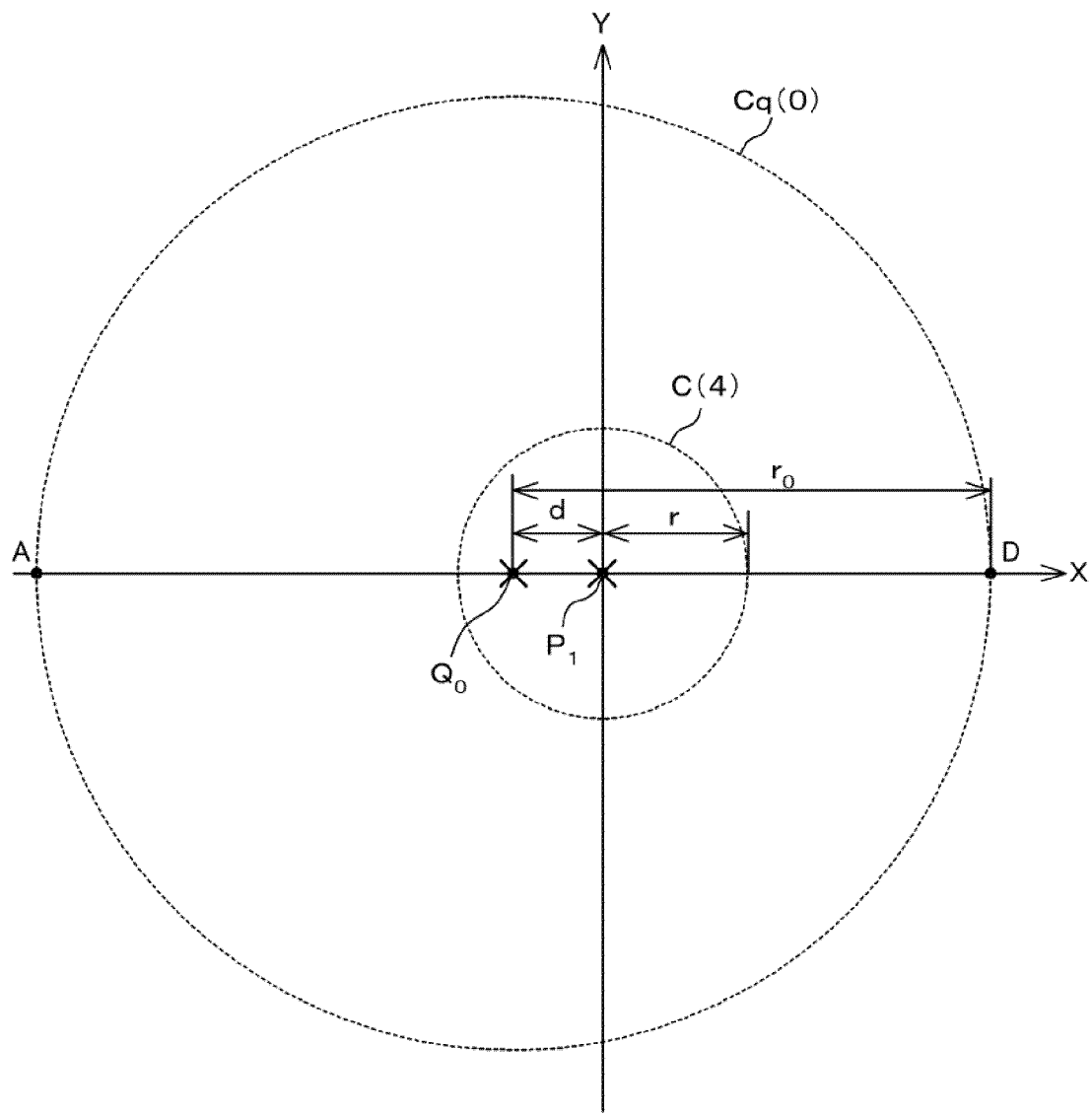
FIG. 15 is a diagram for explaining the operation of an iris pattern identifying unit.

As illustrated in FIG. 15, a circle Cq(0), whose center is located on the X-axis and whose outer perimeter passes through point (A,0) and point (D,0) in the XY coordinate system, is considered. The circle Cq(0) is a circle whose center point $Q_0$ is located at point ((A+D)/2,0), and whose radius is (D−A)/2. The circle Cq(0) nearly coincides with the outer edge of the iris, and the circle C(4) nearly coincides with the outer edge of the pupil. Therefore, the iris pattern identifying unit 39 identifies the area that is specified by the circle C(4), whose center is position $P_1$ in image P1, and the circle Cq(0) as the area where the image of the iris exists. The iris pattern indentifying unit 39 then notifies the comparison unit 50 of the identified result.

The comparison unit 50, first, based on the image of the iris that was identified by the iris pattern identifying unit 39, generates a code for the target person who will be the object of comparison.

As illustrated in FIG. 15 the center $P_1$ of the circle C(4), which nearly coincides with the outer edge of the pupil, and the center $Q_0$ of the circle Cq(0), which nearly coincides with the outer edge of the iris, do not typically coincide. This is because, due to parallax, typically the lines of sight of a person's left and right eye are not parallel, and even when an image is taken of an eye from the front of the target person, the optical axis of the lens (not illustrated in the figure) of the imaging device and the line of sight are not parallel. The iris is spherical, so when the optical axis of the lens is at an angle with respect to the line of sight, the center of the iris and the center of the pupil become misaligned in the digital image P that is taken by the imaging device 10.

Figure 16:
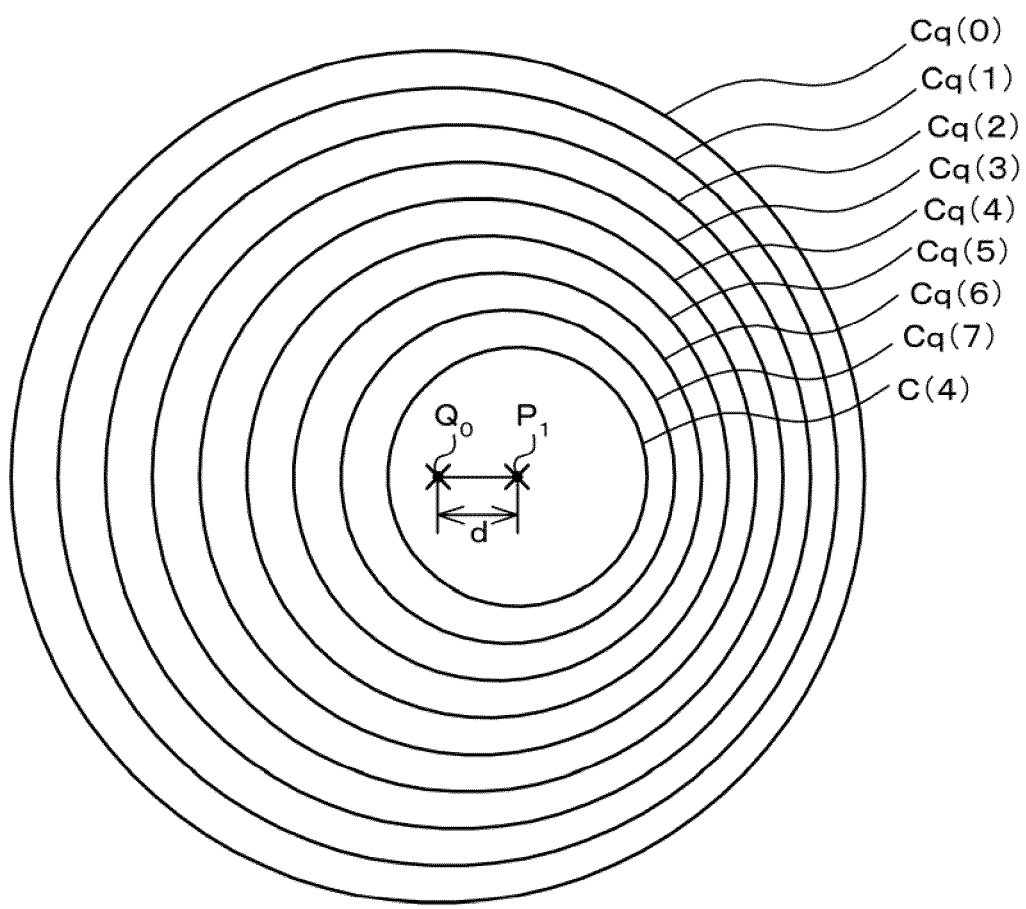
FIG. 16 is a diagram from explaining the operation of a comparison unit (1/3).
Figure 17:
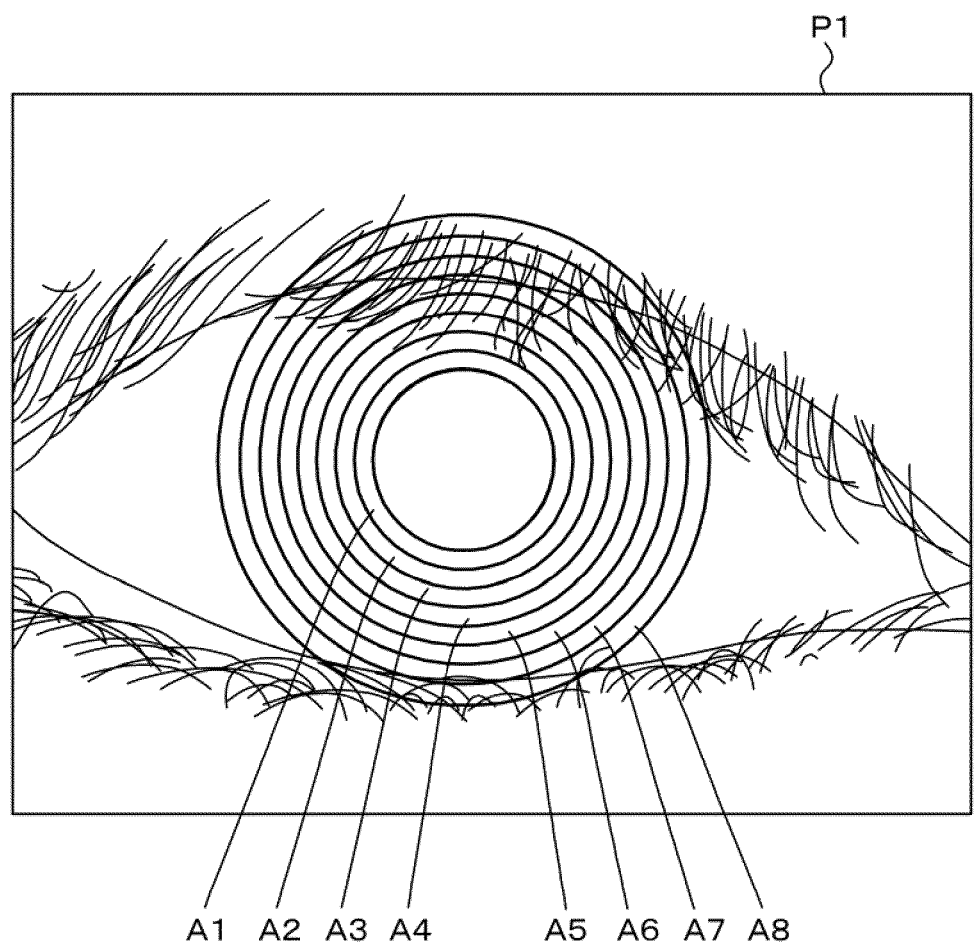
FIG. 17 is a diagram from explaining the operation of a comparison unit (2/3).

Taking into consideration the situation above, the comparison device 50, as illustrated in FIG. 16, divides the area specified by the circle C(4), which nearly coincides with the outer edge of the pupil, and the circle Cq(0), which nearly coincides with the outer edge of the iris, into eight ring shaped areas by using seven circles Cq(1) to Cq(7). This operation is explained in detail below.

First, the comparison device 50 measures the distance d between the center $P_1$ of the circle C(4), and the center $Q_0$ of the circle Cq(0). The comparison device 50 then calculates the centers $Q_1$ to $Q_7$ of the circles Cq(1) to Cq(7) by respectively adding the values obtained by dividing the distance d by 8 to the X coordinate of the center $Q_0$. The coordinates of the centers $Q_1$ to $Q_7$ are calculated as $Q_1$ ((A+D)/2+d/8,0), $Q_2$ ((A+D)/2+d/4,0), $Q_3$ ((A+D)/2+3d/8,0), $Q_4$ ((A+D)/2+d/2, 0), $Q_5$ ((A+D)/2+5d/8,0), $Q_6$ ((A+D)/2+3d/4,0) and $Q_7$ ((A+D)/2+7d/8,0).

Next, the comparison device 50 calculates radius $r_1$ to radius $r_7$ of the circles Cq(1) to Cq(7) by respectively subtracting the values obtained by dividing the difference between the radius (r) of circle C(4) and the radius $r_0$ of the circle Cq(0) by 8 from the radius $r_0$ of the circle Cq(0). Radius $r_1$ to radius $r_7$ are calculated as $r_1$: $(r_0-(r_0-r)/8)$; $r_2$: $(r_0-2\cdot(r_0-r)/8)$; $r_3$: $(r_0-3\cdot(r_0-r)/8)$; $r_4$: $(r_0-4\cdot(r_0-r)/8)$; $(r_0-5\cdot(r_0-r)/8)$; $r_6$: $(r_0-6\cdot(r_0-r)/8)$ and $r_7$: $(r_0-7\cdot(r_0-r)/8)$.

Next, based on the calculation results of the centers $Q_1$ to $Q_7$ and radii $r_1$ to $r_7$ that were calculated as described above, the comparison device 50, as illustrated in FIG. 16, specifies seven circles Cq(1) to Cq(7) in the area specified by circle Cq(0) and circle C(4). As a result, as can be seen by referencing FIG. 17, the image of the iris that is included in image P1 is divided into eight ring shaped areas A1 to A8 by the seven circle Cq(1) to Cq(7).

Next, the comparison device 50 divides each of the eight ring-shaped areas A1 to A8 and into 256 small areas. More specifically, the perimeter of the circles C(4) and Cq(1) to Cq(7) are divided by 256 arcs having the same central angle. Moreover, each small area is generated by specifying one arc group that is formed by the arc of a certain circle (for example, circle C(4)) and the arc of an adjacent circle to that circle (for example, circle Cq(7)) that is correlated to the aforementioned arc, and lines that connect the end points of both arcs. The method of generating the small areas will be explained in more detail with reference to FIG. 18.

Figure 18:
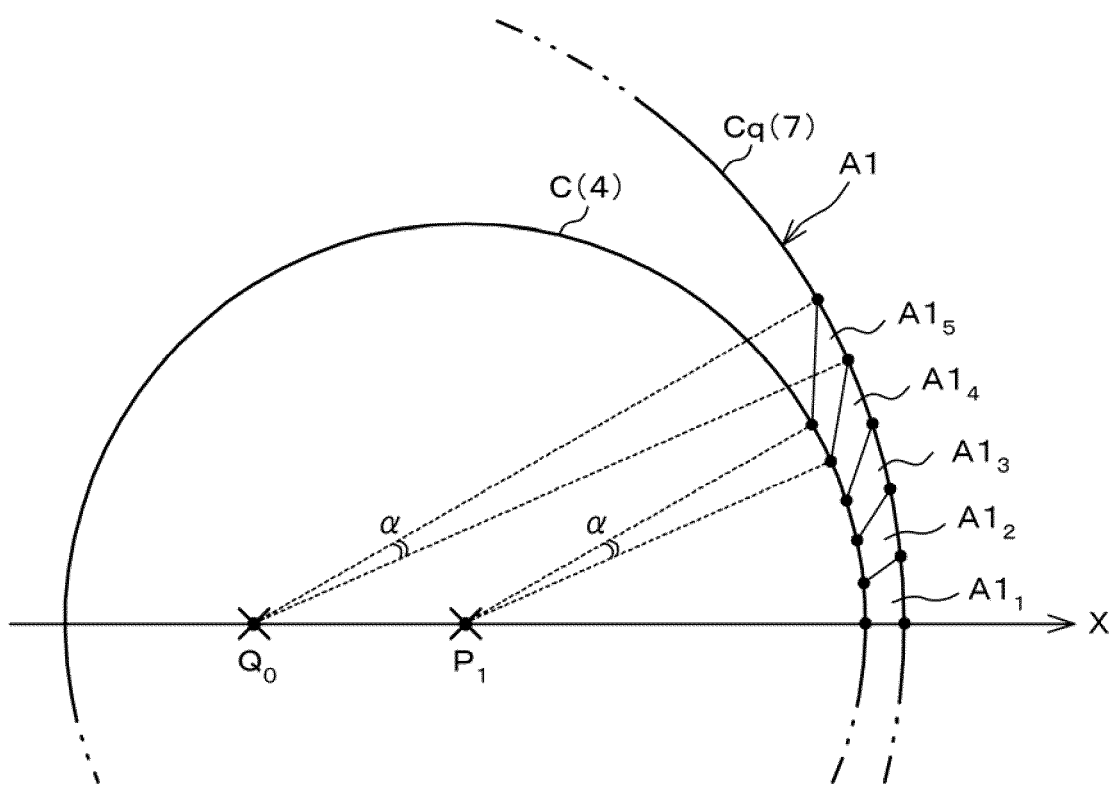
FIG. 18 is a diagram from explaining the operation of a comparison unit (3/3).

FIG. 18 illustrates the state of dividing a ring-shaped area A1 that is specified by circle C(4) and circle Cq(7) into 256 small areas. As illustrated in FIG. 18, the comparison unit 50 divides circle C(4) and circle Cq(7) into arcs having a central angle α (360/256) starting at the intersection between the respective circle and the X-axis, and by specifying lines that connect both end points of the correlated arcs, divides the ring-shaped area A1 into 256 small areas $A1_1$ to $A1_{256}$. Similarly, the comparison unit 50 divides the ring-shaped areas A2 to A8 into small areas $A2_1$ to $A2_{256}$, small areas $A3_1$ to $A3_{256}$, small areas $A4_1$ to $A4_{256}$, small areas $A5_1$ to $A5_{256}$, small areas $A6_1$ to $A6_{256}$, small areas $A7_1$ to $A7_{256}$ and small areas $A8_1$ to $A8_{256}$.

Next, the comparison device 50 finds the average intensity value $AVG1_n$ of the pixels included in a small area $A1_i$ (i=1, 2, . . . , 256) for each of the small areas $A1_1$ to $A1_{256}$ that belong to a ring-shaped area A 1, and by arranging these average values in order, generates a code 1 [$AVG1_1$, $AVG1_2$, $AVG1_{256}$]. Similarly, the comparison device 50 finds the average intensity values AVG2i to AVG8i of the pixels that are included in the small areas A2i to A8i for each ring-shaped area A2 to A8, and by arranging these average values in order, generates a code 2 [$AVG2_1$, $AVG2_2$, . . . , $AVG2_{256}$], a code 3 [$AVG3_1$, $AVG3_2$, . . . , $AVG3_{256}$], a code 4 [$AVG4_1$, $AVG4_2$, . . . , $AVG4_{256}$], a code 5 [$AVG5_1$, $AVG5_2$, . . . , $AVG5_{256}$], a code 6 [$AVG6_1$, $AVG6_2$, . . . , $AVG6_{256}$], a code 7 [$AVG7_1$, $AVG7_2$, . . . , $AVG7_{256}$] and a code 8 [$AVG8_1$, $AVG8_2$, . . . , $AVG8_{256}$]. The comparison device 50 manages the eight codes 1 to 8 above as one comparison target code group.

The comparison device 50 stores data beforehand that is related to a plurality of code groups that comprise eight codes that are correlated with unique personal information that is generated for an image of an iris that is identified using a process similar to the process performed by the image processing device 30. The comparison device 50 compares each of the comparison target code groups with the code groups that are stored beforehand (hereafter, referred to as the comparison code groups). When a comparison code group is identified that has a degree of similarity with respect to a comparison target code group that is equal to or greater than a specified value, the comparison device 50 outputs that result and the personal information that is correlated with the comparison code group to the outside. On the other hand, when a comparison code group that has a degree of similarity with respect to a comparison target code group that is equal to or greater than a specified value is not identified, the comparison device 50 outputs that result to the outside.

As explained above, in this first embodiment, a binary image P2 is generated from a digital image P of an eye, and taking into consideration the low-intensity pixels of the binary image P2 and the high-intensity pixels that are in a specified relationship with those low-intensity pixels, a reference pixel is set that specifies the center of the pupil. More specifically, taking into consideration the high-intensity pixels that are within a specified distance from each of the low-intensity pixels, a reference pixel is set that specifies the center of the pupil. As a result, when compared with identifying the center of the pupil from just the low-intensity pixels, it is possible to more accurately identify the center of the pupil. By being able to accurately identify the center of the pupil, it becomes possible to improve the accuracy of processing for identifying the image of the iris that is performed based on this reference pixel, and as a result it becomes possible to identify the image of the image with good accuracy.

Moreover, in this first embodiment, the centers of the two circles having different radii coincide with the center of the position of a reference pixel. A circle that specifies the outer edge of the image of a pupil is identified based on the change in the value of the ratio of the number of low-intensity pixels inside each circle with respect to the difference in the surface areas of the two circles. Using this circle, the position of the center of the pupil is identified. As a result, when compared with the case of identifying the center position of the iris based on the distribution in the X-axis direction or in the Y-axis direction of the pixels of the pupil, it is possible to identify the center position of the pupil with good accuracy. By doing so, it becomes possible to improve the accuracy of processing for identifying the image of the iris that is performed based on the identified center position of the pupil, and thus it becomes possible to identify the image of the iris with good accuracy.

From the above, in this first embodiment, it is possible to identify the image of the iris with good accuracy, and thus it is possible to perform user authentication base on this image with good accuracy.

Furthermore, in this first embodiment, a circle C(N) having a statistically proper radius that is based on the result of Equation (1) and Equation (2), which are derived using the total value ΣV of the reference pixel $PX_0$, is used for calculating the center position of the reference pixel $PX_0$. As a result, it is possible to quickly identify the circle that specifies the outer edge of the iris.

(Embodiment 2)

Next, a second embodiment of the present invention will be explained with reference to FIG. 19 and FIG. 20. The same reference numbers will be used for components that are the same or equivalent to those of the first embodiment, and any redundant explanation will be omitted or simplified.

The biometric authentication device 2 of this embodiment differs from the biometric authentication device 1 of the first embodiment in that the image processing device 30 is achieved using construction that is similar to a device such as a typical computer or work station.

Figure 19:
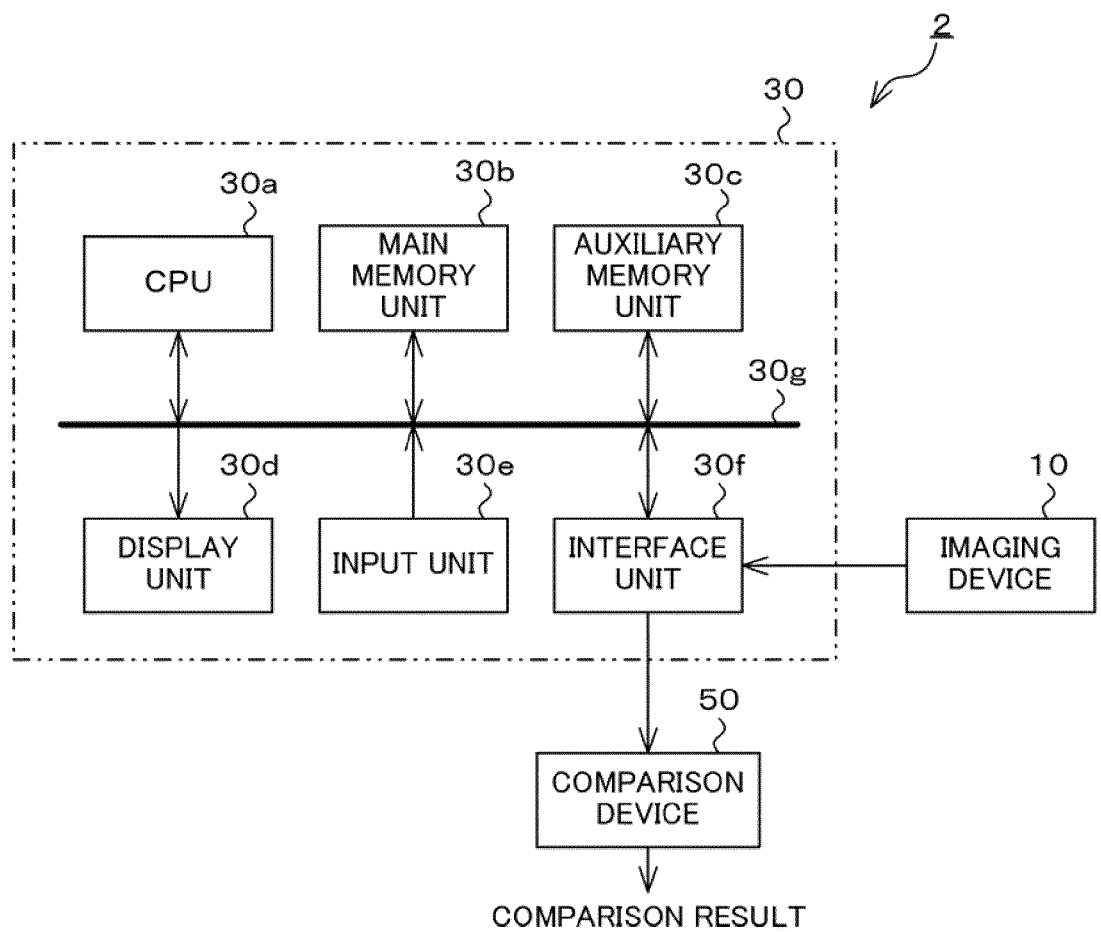
FIG. 19 is a block diagram of a biometric authentication device of a second embodiment of the present invention.

FIG. 19 is a block diagram illustrating the physical construction of the biometric authentication device 2. As illustrated in FIG. 19, the biometric authentication device 2 comprises an imaging device 10, an image processing device 30 comprising a computer, and a comparison device 50.

The image processing device 30 comprises a CPU (Central Processing Unit) 30a, a main memory unit 30b, an auxiliary memory unit 30c, a display unit 30d, an input unit 30e, an interface unit 30f and a system bus 30g that mutually connects all of the parts.

According to a program that is stored in the auxiliary memory unit 30c, the CPU 30a executes image processing (described later) on an image P that was taken by the imaging device 10.

The main memory unit 30b has a RAM (Random Access Memory). The main memory unit 30b is used as a work area for the CPU 30a.

The auxiliary memory unit 30c comprises a non-volatile memory such as a ROM (Read Only Memory), a magnetic disk, semiconductor memory or the like. This auxiliary memory unit 30c stores programs that are executed by the CPU 30a and various parameters. The auxiliary memory unit 30c also stores information that includes processing results from the CPU 30a.

The display unit 30d comprises a CRT (Cathode Ray Tube) or LCD (Liquid Crystal Display). The display unit 30d displays processing results from the CPU 30a. In this embodiment, every time processing is executed on the digital image P, a binary image P2 and image P3 are displayed on the display unit 30d as the processing results.

The input unit 30e comprises a keyboard and pointing device such as a mouse. Instructions from an operator are inputted from this input unit 30e and notified to the CPU 30a via the system bus 30g.

The interface unit 30f comprises a serial interface or LAN (Local Area Network) interface. The image device 10 and comparison device 50 are connected to the system bus 30g via an interface unit 30f.

Figure 20:
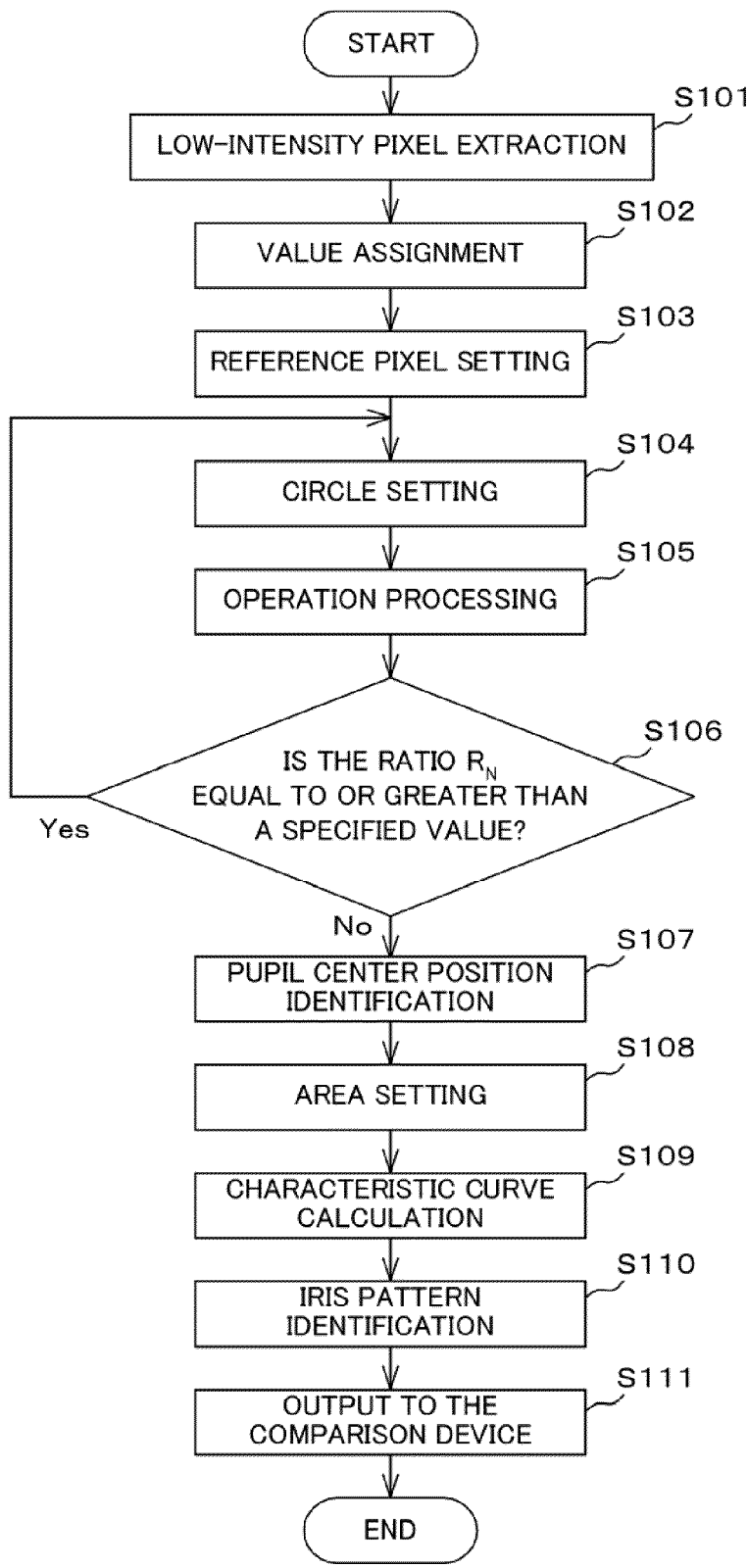
FIG. 20 is a flowchart illustrating the operation of an image processing device.

The flowchart in FIG. 20 corresponds to a series of processing algorithms of a program that is executed by the CPU 30a of the image processing device 30. The image processing that is performed by the image processing device 30 is explained with reference to FIG. 20. This image processing is achieved by the CPU 30a controlling the main memory unit 30b, auxiliary memory unit 30c, display unit 30d and interface unit 30f all together according to a program that is read from the auxiliary memory unit 30c.

First, the CPU 30a extracts low-intensity pixels having a intensity that is equal to or less than a specified value from among the plurality of pixels that form the digital image P that was taken by the imaging device 10 (step S101). More specifically, the CPU 30a extracts low-intensity pixels from the binary image P2 that is obtained through image transformation of the digital image P using a threshold value.

Next, the CPU 30a sequentially selects extracted low-intensity pixels, and assigns the value 1, for example, to each of a plurality pixels that are within a specified distance from the selected low-intensity pixels (step S102).

The CPU 30a then sets the pixel having the largest total value of assigned values as a reference pixel $PX_0$ (step S103). The position of the reference pixel $PX_0$ nearly coincides with the center of the iris of the eye in the image P1 (FIG. 9).

Next, the CPU 30a sets a circle C(1) whose center is the reference pixel $PX_0$, and a circle C(2) having a radius that is greater than the radius of the circle C(1) (step S104).

The CPU 30a then performs operation processing (step S105). Here, the CPU 30a, first, calculates the surface areas S1 and S2 of the circles C(1) and C(2), and the number of low-intensity pixels $N_1$ and $N_2$ that are inside the circles C(1) and C(2). Next, the CPU 30a calculates the ratio $R_N$ of the number of low-intensity pixels in each circle $(N_2-N_1)$ with respect to the difference in surface areas $(S_2-S_1)$ of the circle C(1) and circle C(2) (here, $R_1$ $(=(N_2-N_1)/(S_2-S_1))$).

Next, the CPU 30a determines whether or not the ratio $R_N$ is equal to or greater than a specified value (step S106). When the ratio $R_N$ is equal to or greater than a specified value (step S106: YES), the CPU 30a returns to step S104.

In this case, the CPU 30a newly sets a circle C(3) having a radius that is greater than the circle C(2) (step S104). The CPU 30a then calculates the surface areas of the circles C(2) and C(3) and the number of low-intensity pixels $N_2$ and $N_3$ inside each circle, and calculates the ratio $R_2$ $((N_3-N_2)/(S_3-S_2))$ of the number of low-intensity pixels in each circle $(N_3-N_2)$ with respect to the difference between the surface areas $(S_3-S_2)$ of circle C(2) and circle C(3) (step S105). After that, processing from step S104 to step S106 is repeated until the ratio $R_N$ becomes less than a specified value (step S106: NO).

When the ratio $R_N$ becomes less than a specified value (step S106: NO), the CPU 30a moves to step S107. For example, as illustrated in FIG. 11, when circle C(4) is set so that it protrudes out from the area specified by pixel groups PG1 and PG2, the judgment in step S106 is NO.

Next, by moving the circle C(4) with the reference pixel $PX_0$ as a reference position, the CPU 30a searches for the center position $P_1$ of the circle C(4) where the number of low-intensity pixels that are included in the circle C(4) becomes a maximum, and identifies the found position $P_1$ as the position of the center of the pupil (step S107).

The CPU 30a then sets a plurality of arc shaped small areas (step S108). Here, the CPU 30a first defines an XY coordinate system with the position $P_1$ in the image P1 as the origin, and with the position $P_1$ in the image P1 as the starting point, specifies triangular areas F1 and F2 that are specified by straight lines L1 and L2 that form 15-degree angles with the X-axis. Next, the CPU 30a sets a plurality of arc-shaped small areas by dividing area F1 with a plurality of arcs having an angle specified by the X-axis and the straight line L1 as a central angle (FIG. 14A). Furthermore, the CPU 30a sets a plurality of arc-shaped small areas by dividing area F2 with a plurality of arcs having an angle specified by the X-axis and the straight line L2 as a central angle.

The CPU 30a then calculates the average intensity values of the pixels included in the small areas for each small area that belongs to area F1 or areas F2, and calculates a characteristic curve SL that indicates the relationship between the position on the X-axis of the small areas and the corresponding average intensity values (step S109).

Next, the CPU 30a identifies the iris pattern (step S110). More specifically, based on the amount of change in this characteristic curve SL, the CPU 30a finds X coordinates A and D, which are intersection points where the outer edge of the iris crosses the X-axis, and identifies where the image of the iris is positioned in the area specified by the circle C(4) and circle Cq(0) in the image P1 (see FIG. 15).

The CPU 30a then outputs information that includes the processing results of step S110 to the comparison device 50 (step S111), and ends this series of processes.

After that, the comparison device 50 divides the image of the iris that was identified by the image processing device 30 into eight ring-shaped areas A1 to A8. Furthermore, the comparison device 50 divides each of the ring-shaped areas A1 to A8 into 256 small areas.

Next, the comparison device 50 finds the average intensity values $AVG1_i$ to $AVG8_i$ of the pixels included in the small areas $A1_i$ to $A8_i$ for each ring-shaped area A1 to A8, and generates comparison target code groups comprising codes 1 to 8 in which these average values are arranged in order.

Comparison device 50 then compares the comparison target code groups with a plurality of code groups comprising the eight codes that were correlated with personal information for identification that was acquired beforehand. When a comparison code group is identified that has a degree of similarity with the comparison target code groups that is equal to or greater than a specified value, the comparison device 50 outputs the result and the personal information correlated with that comparison code group to the outside. On the other hand, when no comparison group is identified that has a degree of similarity with the comparison target code groups that is equal to or greater than a specified value, the comparison device 50 outputs that the result to the outside.

As explained above, in this second embodiment, a binary image P2 is generated from a digital image P of an eye, and a reference pixel that specifies the center of the pupil is set by taking into consideration the low-intensity pixels of the binary image P2 and the high-intensity pixels that are in a specified relationship with each of the low-intensity pixels. More specifically, a reference pixel that specifies the center of the pupil is set by taking into consideration the high-intensity pixels that are within a specified distance from each of the low-intensity pixels. By doing so, in comparison with the case of identifying the center of the pupil from just the low-intensity pixels, for example, it is possible to more accurately identify the center of the pupil. As a result, the accuracy of processing for identifying the image of the iris, which is performed based on this reference pixel, is improved, and thus it becomes possible to identify the image of the iris with good accuracy.

Moreover, in this second embodiment, two circles having different radii are such that the centers of the circles coincide with the position of the reference pixel. A circle that specifies the outer edge of the image of the pupil is identified based on the change in the value of the ratio of the number of low-intensity pixels within each circle with respect to the difference in the surface areas of the two circles. Then, using this circle, the center position of the pupil is identified. In doing so, when compared with the case of identifying the center position of the pupil based on the distribution in the X-axis direction or the distribution in the Y-axis direction of the pixels of the pupil, it is possible to identify the center position of the pupil with good accuracy. As a result, the accuracy of processing for identifying the image of the iris, which is performed based on the center position of the identified pupil, is improved, and thus it becomes possible to identify the image of the iris with good accuracy.

Furthermore, in this second embodiment, it is possible to identify the image of the iris with good accuracy, so it is possible to perform user authentication based on this image with good accuracy.

(Embodiment 3)

Next, a third embodiment of the present invention will be explained with reference to FIG. 21 and FIG. 22. The same reference numbers will be given to components that are the same or similar to those of the first embodiment and second embodiment, and any redundant explanation will be omitted or simplified.

The biometric authentication apparatus of this embodiment differs from the second embodiment described above in that the CPU 30a determines the quality of the image of the iris.

Figure 21:
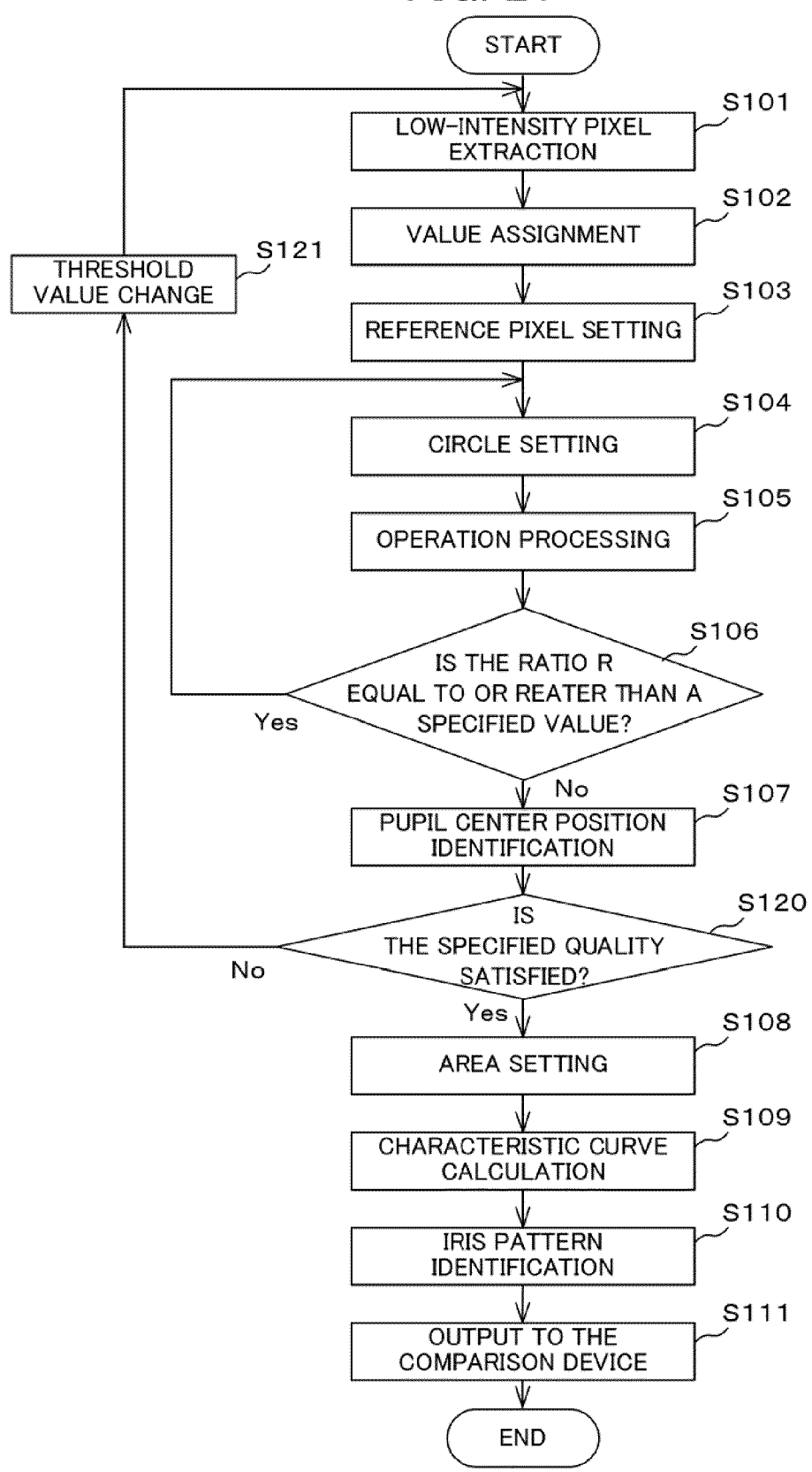
FIG. 21 is a flowchart illustrating the operation of an image processing device of a third embodiment of the present invention.

The flowchart in FIG. 21 corresponds to a series of process algorithms of a program that is executed by the CPU 30a of the image processing device 30 of this third embodiment.

In step S105, the CPU 30a, together with setting a circle C(N), also calculates the percentage (saturation) of the number low-intensity pixels with respect to the number of pixels included in the circle C(N), and stores the result in the main memory unit 30b. After the processing of step S107 has ended, the CPU 30a determines whether or not the image of the pupil satisfies a specified quality (step S120).

Figure 22A:
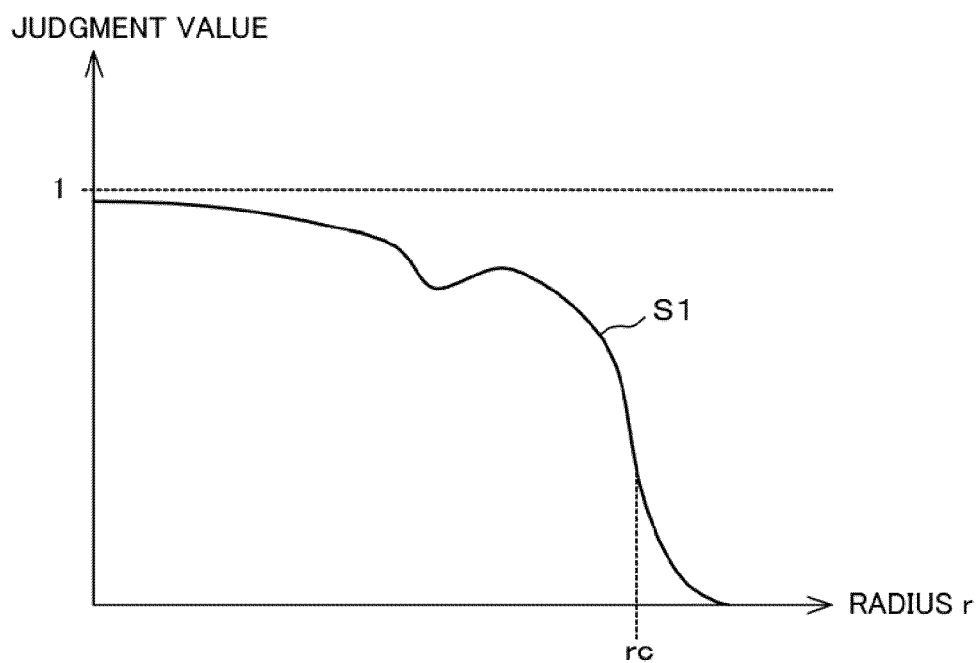
FIG. 22A is a graph illustrating the relationship between the saturation and radius.
Figure 22B:
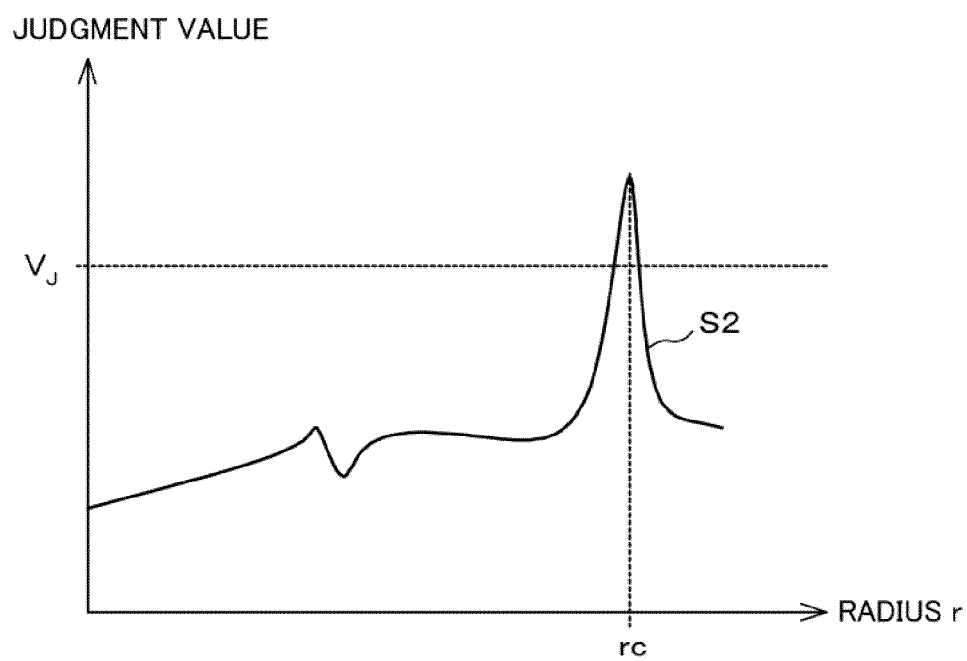
FIG. 22B is a graph illustrating the relationship between the judgment value and radius.

In this step S120, the CPU 30a first, based on information related to the saturation stored in the main memory unit 30b, calculates the curve S1 illustrated in FIG. 22A. This curve S1 is a curve indicating the relationship between the radius of the circle C and the saturation. Next, the CPU 30a performs an operation on this curve S1 using a $\{1, 1, 0, -1, -1\}$ filter, and calculates the curve S2 illustrated in FIG. 22B. More specifically, the CPU 30a sequentially calculates a judgement value of the position r by adding the difference in the saturation at a position separated by one pixel from the coordinate r and the difference in the saturation at a position separated by two pixels.

The CPU 30a then, by determining whether or not the judgment value is equal to or greater than a reference value VJ, determines whether or not the image of the pupil satisfies a specified quality. When the image of the pupil satisfies a specified quality (step S120: YES), the CPU 30a performs the processing from step S108 on. However, when a judgment value equal to or greater than the reference value VJ, and the image of the pupil did not satisfy a specified quality (step S120: NO), the CPU 30a changes the threshold value used for generating the binary image (step S121), and executes the processing of step S101 again. The CPU 30a repeats the processing from step S101 to step S121 until the judgment result in step S120 is YES.

As explained above, in this third embodiment, after the center position of the pupil is set step in S107, the quality of the image of the pupil is determined (step S120). Therefore, it is possible to avoid performing the processing from step S108 to step S111 based on a center position of the pupil having low reliability, so as a result, it is possible to improve the authentication accuracy.

When the judgment value does not exceed the reference value VJ even though the processing of step S120 has been executed the specified number of times, the CPU 30a determines that the value of the radius r that corresponds to the maximum judgment value is the circle that coincides with the outer edge of the image of the pupil, so that the center position of the pupil can be searched for using this circle.

In this embodiment, quality judgment was performed using the operation results of using a filter on the curve S1; however, quality judgment could be performed using a derivative of the curve S1.

Embodiments of the present invention have been explained above, however, the present invention is not limited by the embodiments above.

For example, in the embodiments above, the pixel having the largest value of totaled assigned values was set as a reference pixel $PX_0$; however, the invention is not limited to this, and it is possible to set the pixel that corresponds to the position where the total sum of the distances from a plurality of pixels having a value of totaled assigned values that is equal to or greater than a specified value is the smallest as the reference pixel.

Moreover, in the embodiments above, a value of 1 was assigned to a plurality of pixels within a specified distance from selected low-intensity pixels; however, the invention is not limited to this, and it is possible to assign the largest value to a selected pixel, and for other pixels, to assign values that become smaller as the distance from the selected pixel becomes greater. It is also possible for the assignment unit 32 to directly assign intensity to the pixels instead of applying a value 1. As a result, the totaled value of each pixel becomes, as is, the intensity of each pixel.

Figure 23:
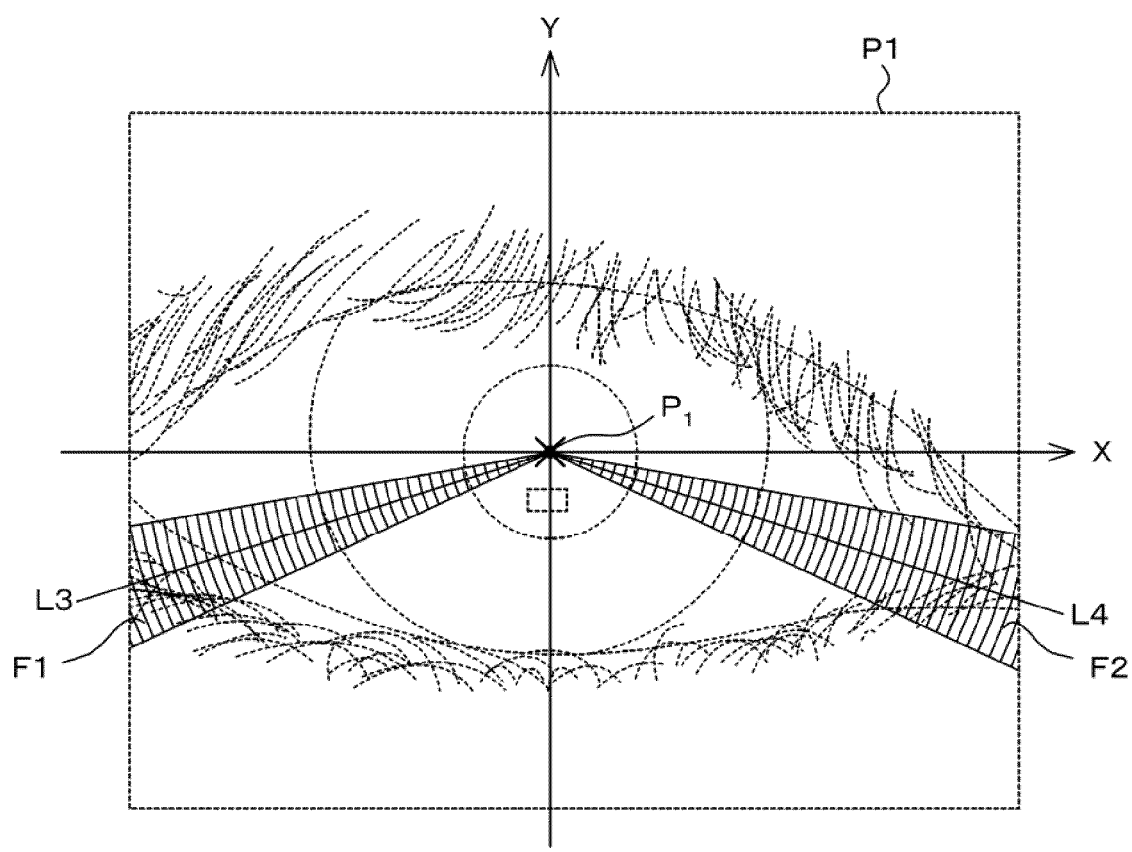
FIG. 23 is a diagram for explaining a variation of the operation for identifying an iris pattern.

Furthermore, in the embodiments above, as illustrated in FIG. 14A, a characteristic curve SL was calculated based on an area F1 that was specified by the X-axis and a straight line L1, and an area F2 that was specified by the X-axis and a straight line L2, however, for example, as illustrated in FIG. 23, the areas can be specified so as to include straight lines L3 and L4 that make an angle of 10 to 15 degrees with the X-axis. In this case, for example, even when the image of the eyelashes of the upper eyelid is mixed with the image of the iris below the X-axis, it is possible to calculate the characteristic curve SL with good accuracy. In short, a plurality of arc shaped small areas are set by uniformly dividing, in a radial direction, two areas, which extend radially to both sides approximately in the X-axis direction from position $P_1$ as a starting point and having a specified central angle, in the radial direction by circular arcs having the position $P_1$ as a center, however, preferably the areas that extend radially from position $P_1$ as a starting point and having a specified central angle are areas that extend radially downward below the X-axis.

In the embodiments above, 256 small areas were set by dividing ring-shaped areas A1 to A8; however, the invention is not limited to this, and it is possible to set rectangular areas, which are formed by connecting the end points of a set of arcs that are correlated by being adjacent circles, along the respective ring-shaped areas A1 to A8.

Moreover, in the embodiments above, the image processing device 30 extracted low-intensity pixels by transforming a digital image P to a binary image P2, however, the invention is not limited to this, and it is possible to directly extract low-intensity pixels from the intensity of pixels of the digital image P.

The image processing device 30 of the embodiments above can be achieved by special hardware, or by a normal computer system.

The program that is stored in the auxiliary memory unit 30c of the image processing device 30 of the second embodiment above can be stored on a computer readable recording medium such as a flexible disk, CD-ROM (Compact Disk Read-Only Memory), DVD (Digital Versatile Disk), MO (Magneto-Optical disk) or the like, and distributed, or a device that executes the processing above can be constructed by installing that program in a computer.

Furthermore, the program above can be stored on a disk drive of a specified server device on a communication network such as the Internet, and superimposed on a carrier wave and downloaded to a computer.

The program above can also be activated and executed while being transferred via a communication network.

Moreover, the image process described above can be executed by executing all or part of the program above on a server device, and transmitting and receiving information related to that processing via a communication network.

When achieving the functions above by sharing by the OS (Operating System), or by the OS and applications working together, it is possible to store just the part other than the OS on a recording medium and distribute that part, or to download that part to a computer.

Various embodiments and variations of the present invention are possible within the broad spirit and scope of the invention. The embodiments described above are for explaining the present invention and do not limit the scope of the invention. In other words, the scope of the present invention is as disclosed in the claims and not the embodiments. Moreover, various modifications and variations that are within the scope of the claims or within the scope of an equivalent invention are considered to be within the scope of the present invention.

INDUSTRIAL APPLICABILITY

The image processing device, image processing method, and recording medium of the present invention are applied to identifying an image of an iris that is included in an image of an eye. Moreover, the biometric authentication device of the present invention is applied to performing authentication using an iris pattern.

EXPLANATION OF REFERENCE NUMBERS 1,2 Biometric authentication device
10 Imaging device
30 Image processing device
30a CPU
30b Main memory unit
30c Auxiliary memory unit
30d Display unit
30e Input unit
30f Interface unit
30g System bus
31 Low-intensity pixel extraction unit
32 Assignment unit
33 Reference pixel setting unit
34 Circle setting unit
35 Operation unit
36 Judgment unit
37 Pupil center position identifying unit
38 Area setting unit
39 Iris pattern identifying unit
40 Accuracy judgment unit
50 Comparison device
P Digital image
P1 Image
P2 Binary image
P3 Image
PX Pixel
$PX_O$ Reference pixel
PG1 Low-intensity pixel group
PG2 High-intensity pixel group
F1, F2 Area
A1 to A8 Ring shape area
C, Cq Circle

The invention claimed is:
1. An image processing device comprising:
an extraction unit that extracts, as an image portion corresponding to a pupil, low-intensity pixels, which have intensity equal to or less than a specified intensity, from a digital image of an eye;

an assignment unit that sequentially selects the low-intensity pixels that were extracted by the extraction unit, and sequentially assigns specified values to each pixel that is within a specified distance from the selected low-intensity pixels; and a setting unit that, based on a value that is totaled for each pixel of values that are assigned to the pixels, sets a reference pixel that corresponds to the center of the pupil of the eye.

2. The image processing device according to claim 1, further comprising:

a specification unit that, in the digital image, specifies a first circle, the center thereof being the reference pixel, and a second circle having a radius greater than that of the first circle;

an operation unit that calculates the ratio of the amount of increase in the number of low-intensity pixels inside the second circle from the number of low-intensity pixels inside the first circle with respect to the amount of increase in the surface area of the second circle from the surface area of the first circle; and a position detection unit that, when the ratio calculated by the operation unit is equal to or less than a specified value, moves the second circle and detects the position of the center of the second circle where the number of low-intensity pixels inside the second circle becomes a maximum.

3. The image processing device according to claim 2, further comprising an evaluation unit that, based on the correlation value between the number of all of the pixels inside the second circle and the number of low-intensity pixels, evaluates the quality of the image of the pupil that comprises the low-intensity pixels that were extracted by the extraction unit; wherein the specified intensity is set based on the evaluation result from the evaluation unit.

4. The image processing device according to claim 3, wherein the correlation value is calculated based on one of the ratio of low-intensity pixels with respect to the number of pixels inside the second circle, the ratio of number of low-intensity pixels inside the second circle and the number of low-intensity pixels other than the low-intensity pixels inside the second circle, and the ratio of the amount of increase in the distance from the reference pixel and the amount of increase in the number of low-intensity pixels within the distance.

5. The image processing device according to claim 2, further comprising:

an area setting unit that sets a plurality of arc-shaped small areas by uniformly dividing, in a radial direction, two areas, which extend radially from both sides approximately in the horizontal direction from the position of the center of the second circle that was detected by the position detection unit as a starting point and having a specified central angle, using a plurality of circular arcs having the position of the center of the second circle as the center;

a characteristic curve calculation unit that calculates a characteristic curve that indicates fluctuation in the radial direction of the average intensity value of pixels included in the small areas; and an iris pattern identifying unit that identifies an iris pattern based on the amount of change in the calculated characteristic curve.

6. The image processing device according to claim 5, wherein the area setting unit sets a plurality of arc shaped small areas in areas that extend radially further downward than the horizontal from the position of the center of the second circle that was detected by the position detection unit as a starting point.

7. The image processing device according to claim 1, wherein the setting unit sets the pixel having the maximum value of totaled assigned values as the reference pixel.

8. The image processing device according to claim 1, wherein the setting unit sets the pixel corresponding to the position where the sum of the distances of all of the pixels having a value of totaled assigned values that is equal to or greater than a specified value is minimum as the reference pixel.

9. The image processing device according to claim 1, wherein the specified value is intensity.

10. The image processing device according to claim 1, wherein the value assigned to the pixel becomes smaller according to the distance from the selected low-intensity pixels.

11. The image processing device according to claim 1, wherein the digital image is a binary image.

12. A biometric authentication device comprising:

an imaging device that takes a digital image of an eye; and the image processing device according to claim 1.

13. An image processing method comprising steps of:

extracting low-intensity pixels, which have intensity equal to or less than a specified intensity, from a digital image of an eye;

sequentially selecting the low-intensity pixels that were extracted, and sequentially assigning specified values to each pixel that is within a specified distance from the selected low-intensity pixels;

setting, based on a value that is totaled for each pixel of values that are assigned to the pixels, a reference pixel that corresponds to the center of the pupil of the eye;

specifying, in the digital image, a first circle, the center thereof being the reference pixel, and a second circle having a radius greater than that of the first circle;

calculating the ratio of the amount of increase in the number of low-intensity pixels inside the second circle from the number of low-intensity pixels inside the first circle with respect to the amount of increase in the surface area of the second circle from the surface area of the first circle; and when the ratio calculated by the operation unit is equal to or less than a specified value, moving the second circle and detecting the position of the center of the second circle where the number of low-intensity pixels inside the second circle becomes a maximum.

14. A computer readable recording medium, a program being thereon that causes a computer to function as:

an extraction unit that extracts low-intensity pixels, which have intensity equal to or less than a specified intensity, from a digital image of an eye;

an assignment unit that sequentially selects the low-intensity pixels that were extracted by the extraction unit, and sequentially assigns specified values to each pixel that is within a specified distance from the selected low-intensity pixels;

a setting unit that, based on a value that is totaled for each pixel of values that are assigned to the pixels, sets a reference pixel that corresponds to the center of the pupil of the eye;

a specification unit that, in the digital image, specifies a first circle, the center thereof being the reference pixel, and a second circle having a radius greater than that of the first circle;

an operation unit that calculates the ratio of the amount of increase in the number of low-intensity pixels inside the second circle from the number of low-intensity pixels inside the first circle with respect to the amount of increase in the surface area of the second circle from the surface area of the first circle; and a position detection unit that, when the ratio calculated by the operation unit is equal to or less than a specified value, moves the second circle and detects the position of the center of the second circle where the number of low-intensity pixels inside the second circle becomes a maximum.

* * * * *